United States Patent
Topolovac et al.

(10) Patent No.: US 8,103,694 B1
(45) Date of Patent: *Jan. 24, 2012

(54) SYSTEM AND METHOD FOR MANAGING DATA IN MULTIPLE BILLS OF MATERIAL OVER A NETWORK

(75) Inventors: Michael Topolovac, San Francisco, CA (US); Eric Larkin, Los Gatos, CA (US); Janet Yu, San Francisco, CA (US)

(73) Assignee: Arena Solutions, Inc., Foster City, CA (US)

( * ) Notice: Subject to any disclaimer, the term of this patent is extended or adjusted under 35 U.S.C. 154(b) by 302 days.

This patent is subject to a terminal disclaimer.

(21) Appl. No.: 12/480,595

(22) Filed: Jun. 8, 2009

Related U.S. Application Data

(63) Continuation of application No. 10/280,123, filed on Oct. 24, 2002, now Pat. No. 7,558,793, which is a continuation-in-part of application No. 09/832,753, filed on Apr. 10, 2001, now abandoned.

(60) Provisional application No. 60/195,918, filed on Apr. 10, 2000, provisional application No. 60/206,219, filed on May 22, 2000, provisional application No. 60/206,221, filed on May 22, 2000, provisional application No. 60/210,935, filed on Jun. 12, 2000.

(51) Int. Cl.
*G06F 17/30* (2006.01)

(52) U.S. Cl. ............................ 707/786; 707/770; 705/29

(58) Field of Classification Search ........... 707/999.009, 707/705, 764, 770, 783, 785, 786; 705/29, 705/28
See application file for complete search history.

(56) References Cited

U.S. PATENT DOCUMENTS

| | | | |
|---|---|---|---|
| 4,875,162 A | 10/1989 | Ferriter et al. | 364/401 |
| 5,197,001 A * | 3/1993 | Mukherjee | 705/29 |
| 5,210,686 A | 5/1993 | Jerrigan | 705/29 |
| 5,493,679 A | 2/1996 | Virgil et al. | 395/600 |
| 5,555,408 A | 9/1996 | Fujisawa et al. | 707/5 |
| 5,655,087 A | 8/1997 | Hino et al. | 395/229 |
| 5,740,425 A | 4/1998 | Povilus | 395/611 |
| 5,826,265 A * | 10/1998 | Van Huben et al. | 1/1 |
| 5,918,228 A | 6/1999 | Rich et al. | 707/10 |
| 5,937,160 A | 8/1999 | Davis et al. | 395/200.33 |
| 6,058,399 A | 5/2000 | Morag et al. | 707/201 |
| 6,128,626 A | 10/2000 | Beauchesne | 707/104.1 |
| 6,141,754 A | 10/2000 | Choy | 713/200 |
| 6,167,406 A | 12/2000 | Hoskins et al. | 707/102 |

(Continued)

OTHER PUBLICATIONS

Blaha et al., "Bill-of-Material Configuration Generation," Data Engineering, 1990. Proceedings. Sixth International Conference on Feb. 5-9, 1990, pp. 237-244.

(Continued)

*Primary Examiner* — Greta Robinson
(74) *Attorney, Agent, or Firm* — Dov Rosenfeld; Inventek

(57) ABSTRACT

A method of storing and managing BOMs of different owners in the same environment. One or more BOMs have an owner. An owner's BOM may include confidential information such that unrestricted access to the confidential information is limited to the owner and any designates of the owner. In particular, one embodiment of the invention maintains a list of items that include the items in the BOMs of the different owners. A unique identifier is used for each item of the list. The item identifiers thus form one namespace. BOMs of different owners share data including confidential data within the same namespace.

63 Claims, 14 Drawing Sheets

U.S. PATENT DOCUMENTS

| | | | | |
|---|---|---|---|---|
| 6,208,995 | B1 | 3/2001 | Himmel et al. | 707/104 |
| 6,212,524 | B1 | 4/2001 | Weissman et al. | 707/101 |
| 6,256,596 | B1 | 7/2001 | Leite, Jr. et al. | 703/2 |
| 6,311,207 | B1 | 10/2001 | Mighdoll et al. | 709/203 |
| 6,338,053 | B2 * | 1/2002 | Uehara et al. | 1/1 |
| 6,339,767 | B1 * | 1/2002 | Rivette et al. | 707/781 |
| 6,434,607 | B1 | 8/2002 | Haverstock et al. | 709/217 |
| 6,438,549 | B1 | 8/2002 | Aldred et al. | 707/9 |
| 6,446,069 | B1 | 9/2002 | Yaung et al. | 707/9 |
| 6,493,679 | B1 | 12/2002 | Rappaport et al. | 705/29 |
| 6,505,205 | B1 | 1/2003 | Kothuri et al. | 707/100 |
| 6,609,108 | B1 | 8/2003 | Pulliam et al. | 705/27 |
| 6,622,149 | B1 | 9/2003 | Kellstrom, Jr. | 707/104.1 |
| 6,651,072 | B1 | 11/2003 | Carino, Jr. et al. | 707/104 |
| 6,741,980 | B1 | 5/2004 | Langseth et al. | 707/2 |
| 6,823,338 | B1 | 11/2004 | Byrne et al. | 707/9 |
| 6,983,278 | B1 | 1/2006 | Yu et al. | 707/9 |
| 7,010,580 | B1 | 3/2006 | Fu et al. | 709/217 |
| 7,558,793 | B1 * | 7/2009 | Topolovac et al. | 1/1 |
| 2001/0056436 | A1 | 12/2001 | Stejskal et al. | 707/200 |
| 2002/0007293 | A1 | 1/2002 | Clemens et al. | 705/7 |
| 2002/0007348 | A1 | 1/2002 | Ali et al. | 705/51 |
| 2002/0023109 | A1 | 2/2002 | Lederer, Jr. et al. | 707/511 |
| 2002/0194178 | A1 | 12/2002 | Gilmour et al. | 707/9 |
| 2003/0163329 | A1 | 8/2003 | Bolene | 705/1 |
| 2003/0200290 | A1 | 10/2003 | Zimmerman et al. | 709/222 |
| 2004/0049294 | A1 * | 3/2004 | Keene et al. | 700/5 |

OTHER PUBLICATIONS

Olsen et al., "A Procedure-Oriented Generic Bill of Materials," Computers & Industrial Engineering, vol. 32, Issue 1, Jan. 1997, abstract.

Wolfram Wöβ, "A Rule-driven Generator for Variant Parts and Variant Bills of Material," Database and Expert Systems Applications, 1997, Proceedings, Eighth International Workshop on, Sep. 1-2, 1997, pp. 556-561.

Brochure: Agile Hosting Services, Agile Software Corp., Jun. 28, 2002. Available at <http://www.agilesoft.com>.

Agile Software, Bill Nee, "Agile Support for XML Standards", Whitepaper, Agile Software Corp., California, Nov. 2001. Available at <http://www.agilesoft.com>.

"Program Review of Eigner + Partner's axalant cPDm Program", CIMdata, Inc., Sep. 2000. Available at <http://www.CIMdata.com>.

Brochure: Product Collaboration in the Medical Device Industry, Agile Software Corp. California, Available at <http://www.agilesoft.com/wp/index.asp>.

Brochure: Collaborative Manufacturing in the Semiconductor Industry, Agile Software Corp. California, Available at <http://www.agilesoft.com/wp/index.asp>.

Trilogy Design, Grass Valley, California. "Parts & Vendors: EX Edition—Extended features." Available at <http://www.trilogydesign.com/ex_edition.htm>.

Trilogy Design, Grass Valley, California. "Parts & Vendors: Data Security." Available at <http://www.trilogydesign.com/data_security.htm>.

Trilogy Design, Grass Valley, California. "Parts & Vendors: Edition Featured Matrix." Available at <http://www.trilogydesign.com/edition_matrix.htm>.

Trilogy Design, Parts & Vendors, "Personal Parts List Manager & Vendor Database for Windows 95/98/NT." Available at <http://www.info@trilogydesign.com>.

Trilogy Design, Parts & Vendors, "Designing or Building Something?" Available at <http://www.trilogydesign.com>.

Shin et al., "Secure and Efficient Schemes to Entrust the Use of Private Keys," Proceedings. IEEE Workshops on Enabling Technologies: Infrastructure for Collaborative Enterprises, 1999. (WET ICE '99), Stanford, California, Jun. 16-18, 1999, pp. 174-177. ISBN: 0-7695-0365-9, INSPEC Accession No. 6423067.

* cited by examiner

SYSTEM AND METHOD FOR MANAGING DATA IN MULTIPLE BILLS OF MATERIAL OVER A NETWORK

CROSS-REFERENCE TO RELATED APPLICATIONS

This application is continuation of U.S. application Ser. No. 10/280,123 filed Oct. 24, 2002 now U.S. Pat. No. 7,558,793 to inventors Topolovac et al. U.S. application Ser. No. 10/280,123 is a continuation in part of U.S. patent application Ser. No. 09/832,753 (now abandoned) filed Apr. 10, 2001 titled SYSTEM AND METHOD FOR MANAGING DATA IN MULTIPLE BILLS OF MATERIAL OVER A NETWORK. The contents of both U.S. application Ser. Nos. 10/280,123 and 09/832,753 are incorporated herein by reference.

U.S. application Ser. No. 09/832,753 (now abandoned) claimed priority from U.S. Provisional Application Ser. No. 60/195,918 entitled "System and Method for Hosting Multiple Bills of Material for Multiple Companies in a Single Namespace" filed Apr. 10, 2000 by Eric Larkin and Michael Topolovac; U.S. Provisional Application Ser. No. 60/206,219 entitled "System and Method for Transparent Electronic Processing" filed May 22, 2000 by Eric Larkin and Michael Topolovac; U.S. Provisional Application Ser. No. 60/206,221 entitled "System and Method for Vendor Performance Tracking" filed May 22, 2000 by Eric Larkin and Michael Topolovac; and U.S. Provisional Application Ser. No. 60/210,935 entitled "Systems and Methods for Utilizing Multiple Bills of Material from Multiple Companies Stored in a Single Namespace" filed Jun. 12, 2000 by Eric Larkin, Michael Topolovac, and Janet Yu, the disclosures of which are hereby incorporated by reference.

BACKGROUND OF THE INVENTION

1. Field of the Invention

The invention relates generally to the field of data management and more particularly to managing data related to Bills of Material on a computer network.

2. Description of Related Art

During development and manufacturing of a product, elements, parts or components of the product are often kept in a structured item list called a bill of materials (hereinafter BOM while the plural form, bills of material, is abbreviated as BOMs). For each such product, a BOM is used to keep track of information such as the number of parts used in manufacturing the product, the identification of parts, part vendors, and part costs. The BOM may also be used as an index or organizational tool for the documentation of a product's components such as component datasheets and mechanical drawings. Furthermore, in some instances BOMs include non-material elements such as assembly and finishing processes, machining steps, and connections. Finally, BOMs may include reference items such as tooling or agency certifications that are not actually included in the product itself, but which are required for its manufacture.

Note that the words items and elements are often used synonymously. Thus, an "item list" is sometimes referred to an "element list," and so forth.

During the product development process a BOM is typically changed frequently and considerable effort is undertaken to collect and maintain BOM data. After the development cycle is complete, the BOM may be used as a guide for purchasing, and for inventory maintenance and cost control. As such, parties involved in a wide variety of organizational tasks generally make use of BOMs.

A BOM typically has a nested or hierarchical structure. For example, a typical BOM for a very simple consumer product includes a first level item list that has the box in which the product is delivered, the packing material used to protect the product from damage during shipping, the product assembly and/or use instructions, and the product itself. The first level item list also includes non-physical reference items such as product certifications and agency approvals. In the case where the product is an assembly of components, the BOM includes a second level item list that has one or more parts of the product enclosure, fasteners, a label, and one or more printed wiring board assemblies, for example. The BOM includes a third level item list for a printed wiring board assembly that typically has the printed wiring board itself and a number of electrical components of various types in various quantities. The printed wiring board item list also includes a non-physical item representing the manufacturing process of assembling the various physical parts together onto the printed wiring board. The printed wiring board item list also includes items such as fiducials and test points that are fabricated as an integral part of the printed wiring board.

It is common to refer to a nested BOM as a multi-level BOM and to an item list for a particular assembly as a single-level BOM. A multi-level BOM is representable as a hierarchical data structure that describes, for example, all the components for manufacturing an item. Such a hierarchical structure may be representable as a tree with each node of the tree an item of a BOM. An item, i.e., the node of the tree, may be an article, a process, the material used by the process, and so forth. A node of a BOM may itself be represented by a BOM. An item in a BOM, for example, may be a subassembly, and there may be a separate BOM that describes that subassembly, including the components, and in some cases the process for creating a component.

BOMs are often very complex, with hundreds or thousands of items and five to ten or more levels. It is common for the same item or subassembly to appear multiple times at multiple levels in a BOM. In addition, subassemblies are often used in quantities greater than one. Both of these situations substantially complicate tracking of a total component count. For this reason, a separate single-level item list is sometimes developed that includes one line for each unique item in a BOM, each line including a total quantity of that item used in the product. The development of such an item list is referred to as the flattening of the BOM, and the resulting single-level item list is often called a flattened BOM. Flattening a BOM during product development is often done by a single individual working with a computer application program such as a spreadsheet and is a time-consuming and error-prone process. Further, when the BOM changes frequently during product development, maintaining a flattened BOM is very difficult.

As noted above, BOMs additionally serve as guides for purchasing. The inclusion of non-physical and non-purchasable elements such as fiducials and test points in a BOM can be a source of confusion when the BOM is used in this manner. Non-technical staff may spend considerable time attempting to find sources for non-physical items or for items such as test points that are produced as a by-product of another manufacturing process. For this reason, separate item lists are often developed for purchasable and non-purchasable elements in a BOM. Because the resulting item list is often used as a guide for purchasing items, it is commonly referred to as a purchasing BOM. A purchasing BOM is typically created manually during product development.

The creation of flattened and purchasing BOMs is often combined, resulting in a flattened purchasing BOM. As can be appreciated, the manual process of creating the flattened purchasing BOM is time-consuming and prone to human error.

In a typical industrial setting, a single company manufactures many products each of which requires a BOM. Each such BOM may include common parts and subassemblies. In such situations, it is desirable to maintain a master item list (also called a master element list) of the items used in the company's products and to require that all items in the company's BOMs be included in the master item list. Generally a company's master item list and the BOMs that it references are confidential, e.g., closely guarded trade secrets, as access to such information would assist a competitor in replicating the company's products. The secrecy of such information is even more critical during product development, when access by a competitor would permit the competitor to anticipate the company's future direction and future product features. Thus master item lists and BOMs are conventionally maintained on a company's computer system and not placed in a common computing environment with data from other companies. Further, multiple companies' BOM data is never stored in a single database.

While the master item list and the collection of product BOMs as a whole are generally kept secret, a company must share information about individual items including discrete parts and subassemblies with its suppliers in order to permit the suppliers to manufacture the parts and subassemblies. In cases where a company uses a contract manufacturer to produce an entire product on a turnkey basis, the company must share the entire product BOM with the contract manufacturer. Currently, with prior art systems, information is shared with suppliers on an ad hoc basis, with individual engineers or purchasing agents mailing or e-mailing product documentation to the suppliers. As a result, suppliers frequently have out-of-date or otherwise incorrect information about items and subassemblies. This method of sharing information does not enable a company to easily determine which information each supplier has and if the release of the information is appropriate.

Various software tools have been developed to manage BOMs. Each of these tools provides limited functionality to address a specific aspect of BOM management. For example, to facilitate the manufacturing process and to plan the procurement of product components, conventional computer software called Manufacturing Resource Planning (MRP) software may be employed. MRP software uses a product BOM as the basis for such planning. However, MRP software is very complex to use. In addition, MRP software typically assumes that the product BOM changes very infrequently and as a result only provides inadequate tools for entering changes to the BOM. For these reasons, MRP software is rarely used during product development, when the product BOM may be changing on a daily or weekly basis and ease-of-use is important. Further, the calculations performed by MRP software are quite intensive and a single computer or server is typically dedicated to running the MRP software for one company or user. The computer used for this purpose is typically housed on-site at the company for security and convenience.

The most common category of software tool used for BOM management during product development is the general-purpose spreadsheet, of which Microsoft Excel® is an example. However spreadsheets are not well suited to BOM management. As noted above, a BOM is a complex collection of information that is typically developed and used by a group of people working together. Such information is more efficiently managed with a multi-user, relational database, while a spreadsheet is best characterized as a single-user flat-file database.

Examples of database applications employed to manage BOMs include Agile Anywhere® by Agile Software Corp. of San Jose, Calif. and Vendors® by Trilogy Design of Grass Valley, Calif. These applications provide a dedicated multi-user database for managing a single company's master item list and related BOM data during product development, including vendor and inventory information and item specification documents. However, these applications do not provide any means to maintain master item lists and BOM data from multiple companies or unrelated users in a single computer system or in a single database.

Furthermore, the set-up and management of dedicated computer systems for BOM management is difficult and expensive. This fact is widely recognized, as is evidenced by Agile Software's "Hosting" service. This service permits a company to pay Agile Software to maintain a dedicated BOM management database on a dedicated computer at an offsite facility with access to the database provided by secure connections over the Internet. Agile Software claims to be able to set up a customer with hosting in " . . . as little as four weeks" (Agile Hosting Datasheet, Document #DSHOST-B 06/00, Agile Software Corp.).

The hosting of data from more than one company in a single database is known in the art. For example, Yahoo! Corporation provides a service that permits companies to set up virtual storefronts or catalogs on the Internet for presentation to potential customers. These and related services allow companies to combine non-confidential catalog data into a common database managed by a third party and thereby reduce the cost of set-up and maintenance of an electronic commerce Web site. A notable feature of such services is that the hosted data is considered non-confidential by the participating companies.

Known database systems further enable a contract manufacturer to combine BOM data from multiple customer companies into a single database using conventional MRP or BOM management software. As such, the contract manufacturer combined database is a BOM management database for the contract manufacturer and is established for the sole use of the contract manufacturer. In particular, the contract manufacturer is not permitted to keep track of which customer supplied which data, except through cumbersome manual tabulation and labeling of individual item and BOM relations. Furthermore, customer companies of the contract manufacturer are not generally permitted access to the combined database, as this would violate the confidentiality of other customer companies' data. In the rare situations where customer access is permitted, access privileges must be administered on an ad hoc basis by manually designating which BOM data should be available to which customer. In addition, the combined database represents a duplication of BOM data, that is, the customer maintains one representation of the product BOM on their own system, and the contract manufacturer maintains a second representation on the contract manufacturer's system.

Master item lists in prior BOM management systems include only items as represented by the company that owns the system. That is, the namespace of the items is only for the company that owns the BOMs. The same item cannot appear in another company's BOM, but rather a duplicate instance needs to appear in that other BOM. As a consequence, prior art BOM management systems do not permit representation of another company's items as distinct entities within the BOM management system of a company. For example, documents and information such as supplier datasheets are typically duplicated by the supplier's customer companies and then stored and tracked under each customer company's item identifier, e.g., item number. In some cases, the same supplier item may be approved for use as multiple items for the one customer. For example, a single supplier's 1% tolerance resistor may be approved for use as the one customer's 1% tolerance resistor and also as the same customer's 5% tolerance resistor. In such a situation, the supplier's item information is replicated multiple times in the customer's BOM management system. This presents difficulties when the supplier changes the supplier item data, as each of the duplicate representations of the supplier item in the customer's BOM management system must be updated individually. Thus, there is a need for a BOM management system that permits a company to maintain representations of other companies' BOM data, including items, while minimizing the duplication of such data.

Conventional software tools further include those that provide for the analysis of BOM data and the categorization of items in a master item list. During product development and production, it is common to categorize components as line items of a BOM by type such as molded plastic part, printed circuit board, and integrated circuit and then to conduct design analysis to determine the relative number and value of each type of component contained in a particular product or group of products. A typical statement that would arise from this type of analysis is "in product X, mechanical components account for 5% of the total number of components and 25% of the overall product cost." This type of analysis is often done to direct cost-reduction efforts, both in development and in production.

Because of the recognized need to categorize components by type, developers of software tools that manage and maintain item lists (also called element lists) and BOMs conventionally include functionality that permits component type categorization. This functionality is implemented with either a fixed "built-in" scheme for type categorization, or support for a single user-specified application-specific categorization scheme. When implemented, these solutions permit only one level of categorization, so either the developer or the user of the software tool must decide how many different categories to include, and what level of detail to include in each category type.

When the categorization scheme is specified by the software tool developer, problems arise because different users typically want different categorization schemes. For example, a manufacturer of optical equipment may need a very precise categorization of different lens types and have no need for a categorization of electrical components. Alternatively, a manufacturer of door locks would need a detailed categorization of mechanical components, but have no need to categorize lenses or electrical components.

Problems also arise when a company using the software tool can specify the categorization scheme in their implementation of the categorization. Different individual users of the system need different levels of detail in the categorization scheme. Clerks who assign item numbers typically prefer a simple system with few categories, as less technical knowledge is required to correctly categorize an element. Engineers and technical managers typically prefer a system with more categories, because this is more useful in performing design analysis. A technical manager may prefer relatively few, broad categories (for example, electrical, mechanical, packaging), while the individual engineers typically want categories that reflect a much more precise categorization. However, even different engineers typically care about different levels of detail. An electrical engineer may wish to categorize electrical components very precisely, but be happy to group all mechanical components together into one category. Conversely, a mechanical engineer may want to categorize mechanical components very precisely and not care about electrical components. Conventional systems do not have the flexibility to meet these varied preferences.

The difficulty of addressing component categorization in a way that adequately serves the needs of different companies and different users within the company is so severe that many developers of software tools that manage and maintain item lists and BOMs have chosen to omit this functionality. Furthermore, prior art categorization systems are inflexible and limited in their use. They do not adapt well to specific applications and are inadequate for analyzing BOMs. Prior art categorization systems also do not support multiple categorization levels, inheritance of category properties, and multiple views of category detail.

In sum, conventional systems do not provide for the flexibility required of BOM management systems. For example, prior art technology does not facilitate the sharing of information between BOMs, particularly when the BOMs are developed by different users. The lack of shared BOM data inhibits activities such as identification of vendors, rating of parts, rating of vendors, rating of manufacturers, calculation of cost estimates, identification of components and alternative components, and execution of electronic transactions. In the prior art, the presence of an element, and data concerning that element, in a BOM is not fully exploited when a second BOM is developed. The prior art technology also does not facilitate the presentation of a variety of views of a BOM or a variety of views of elements within a BOM. Finally, there are no means by which data within a BOM can be used to provide a user with additional useful information about related elements and products.

Conventional systems do not facilitate grouping of user data across separate BOMs. For example, there are no prior art systems for storing more than one BOM, owned by more than one user, in a single namespace. A single namespace includes a set of names, each a unique identifier. The names, for example, may be one or more primary keys of a database. Thus a single namespace shares the one or more primary key to uniquely identify the entity of the key. In the prior art it is not possible to store multiple BOMs within a single data file or set of files that share a set of one or more primary keys, while maintaining ownership and/or access control to individual BOMs and to the BOM data, and for sharing BOM data among stored multiple BOMs, with the BOMs not necessarily having the same owner. Thus, the prior art does not allow the storage of BOMs from multiple companies, or any other "owning" entity, in a single database or similar computational process. Advantages of BOM aggregation are therefore not achievable in the prior art.

SUMMARY OF THE INVENTION

Described herein is a method for managing a plurality of bills of material (BOMs) that includes storing a database in a processing system. The database includes a list of elements each having a unique identifier, one or more elements of the list of elements being for inclusion in one or more of a plurality of bills of material (BOMs). The database further includes one or more data structures for storing the plurality of BOMs. Each BOM is describable as a tree. Each node of the tree is an element of the list of elements. At least one element in two or more of the BOMs is associated with an owner of a set of owners. Two or more of the BOM are associated with a respective owner of the set of owners. The database may contain two BOMS associated with two different owners.

The method further includes providing remote access to one or more items of information in the database to one or more users.

In one embodiment, at least one of the BOMs includes confidential information of the owner of the BOM such that that unrestricted access to the confidential information is limited to the owner and any designates of the owner of the BOM.

In one embodiment, one or more elements in the element list are associated with a respective owner of the set of owners. The list of elements includes an indication of ownership for each element associated with one of the owners. The method includes restricting access to information about a particular element in the element list that is associated with a particular owner to the particular owner or any designates of the particular owner.

A first BOM of a first owner may share one or more elements of the list of elements with a second BOM of a second owner.

In one embodiment, each BOM data structure is for storing the parent-child relationships for at least one BOM of the plurality of BOMs. A BOM data structure includes, for a particular BOM, an entry for each element in the particular BOM. That element entry includes a reference to the element's entry in the list of elements, an entry indicating the owner, and an entry indicating any child of the element in the case the element has a child in the tree representing the particular BOM.

The database maintains the BOMs of multiple owners in an element relations list and also a master item lists (the element list), so that such data is maintained in the one database or in the one computer environment. Having this data in the one database provides different views and different levels of access of a single BOM to different users depending on the owners associated with the user and/or with the BOM.

The database containing the BOM data associated with more than one owner may be stored remotely from the different users of the system. Each remote user may access the database. In one embodiment, the access is provided by secure connections over the Internet.

The data stored in the database may be confidential to one or more of the owners.

One aspect of the invention is the automatic assigning of access privilege and view according to the identity of the user, for example according to the owner associated with the user or with the role played by the user.

By maintaining representations of a set of owners' BOM data, including a single list of items, the duplication of item data is significantly reduced.

One aspect of the invention is the analysis of BOM data that includes the private categorization of items in a shared master item list. Thus different owners may use different categorization schemes for the same items. Such categorization includes multi-level categorization.

One aspect of the invention is the sharing of information between BOMs, even in the case that the BOMs are associated with different owners. Including the BOM data associated with several owners in the same database provides for identification of vendors, rating of parts, rating of vendors, rating of manufacturers, calculation of cost estimates, identification of components and alternative components, and execution of electronic transactions.

One aspect of the invention is the storing multiple BOMs within a single database that share a set of one or more primary keys, while maintaining ownership and/or access control to individual BOMs and to the BOM data.

In one aspect of the invention, data of the database may be grouped together into a "workspace." In one embodiment, each workspace has an owner, i.e., an entity such as a company. One embodiment includes some common data provided for convenience, e.g., common conversion factors and currency data, that is made available to all workspaces.

In another aspect of the invention, a workspace is defined as a set of data of the database having the same owner.

A vendor list includes data related to vendors for elements in the element list. Vendor list also optionally includes, for each vendor, vendor identification data such as one or more of vendor name, vendor contact information, and vendor identification number.

The database includes a vendor element relations list that includes data delineating which vendors of vendor list supply BOM elements of the element list. The vendor element relations list describes the sourcing relationship between an item in the element list and a supplier in the vendor list. The vendor element relations list optionally further includes information about the quantity of each element that the referenced vendor can supply.

In one embodiment, the user list includes information data to associate one or more users with a vendor in the vendor list. In one aspect of the invention, code is included that uses this data associating users and vendors in conjunction with vendor element relations list to permit users associated with a vendor to access elements in the element list that are supplied by the vendor.

In one aspect of the invention, elements from multiple BOMs from multiple users are stored together in the element list. These users may "own" BOMs or workspaces that include private user specified element lists. These users, through ownership, control access to and manipulation of data within those BOMs. For example, in one embodiment, multiple companies can add elements in the element list while only those elements introduced or owned by a specific user are edited by that user. The user can provide a variety of access privileges to other users such as other employees of the same enterprise.

Computer code operating within a processing system disaggregates multiple BOMs in the element relation list and/or the element relation list owned by multiple owners into individual elements, remove proprietary information from the data of the elements, and then compiles the non-proprietary information into a database of sources for the elements. The database of element sources allows computer code operating within the system to recommend sources for elements when a user creates a new BOM.

The foregoing and other aspects of the invention will become apparent to those of ordinary skill in the art after having read the following detailed description as illustrated in the various drawing figures.

DETAILED DESCRIPTION OF THE INVENTION

The invention provides a method for managing BOMs of disparate owners in the same environment. Each BOM has an owner. An owner's BOM includes confidential information such that unrestricted access to the confidential information is limited to the owner and any designates of the owner. In particular, one embodiment of the invention maintains a list of items that include the items in the BOMs of the different owners. A unique identifier is used for each item of the list. The item identifiers thus form one namespace. BOMs of different owners share data including confidential data within the same namespace.

Figure 1:
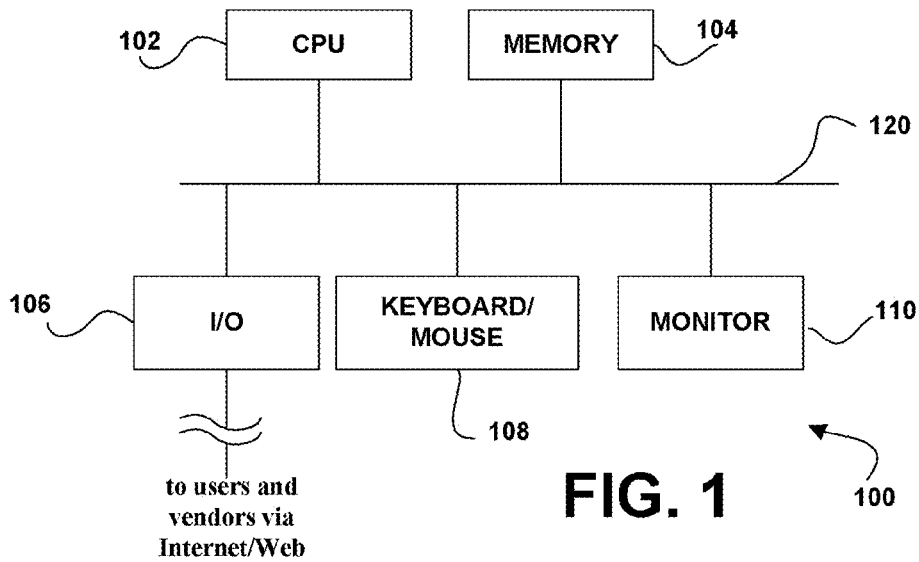
FIG. 1 illustrates a system 100 in which the invention may be practiced.

The invention may be practiced on a computer system that may be a single computer system or a distributed system. FIG. 1 illustrates a processing system 100 in which the invention may be practiced. The system 100 is conventional, and many variations are possible. The simple example shown in FIG. 1 includes at least one central processing unit 102, a "memory" 104, and an input/output (I/O) interface 106, all connected by a "system bus" 120. The term system bus is used herein to denote all the busses across which different elements of the system 100 communicate, and thus typically includes more than one physical bus. I/O interface 106 connects system 100 to users and vendors via a communications network such as the Internet, thereby allowing system 100 to exchange data with users and vendors. I/O interface 106 is thus a general term used here to denote more than one means for communicating data. I/O interface 106 thus alternatively connects System 100 to users and vendors via telephone lines and modems, or by any other means for sending and receiving digital data. By the term "memory" such as memory 104 is meant one or more elements including at least one read and write capable memory device. Thus, memory 104 typically includes RAM and multiple memory/storage systems such as magnetic storage (hard disks, and so forth), optical storage, ROM and/or any other memory appliances. In addition, system 100 optionally includes a keyboard/mouse 108, a monitor 110, and other peripheral devices (not shown).

Figure 8:
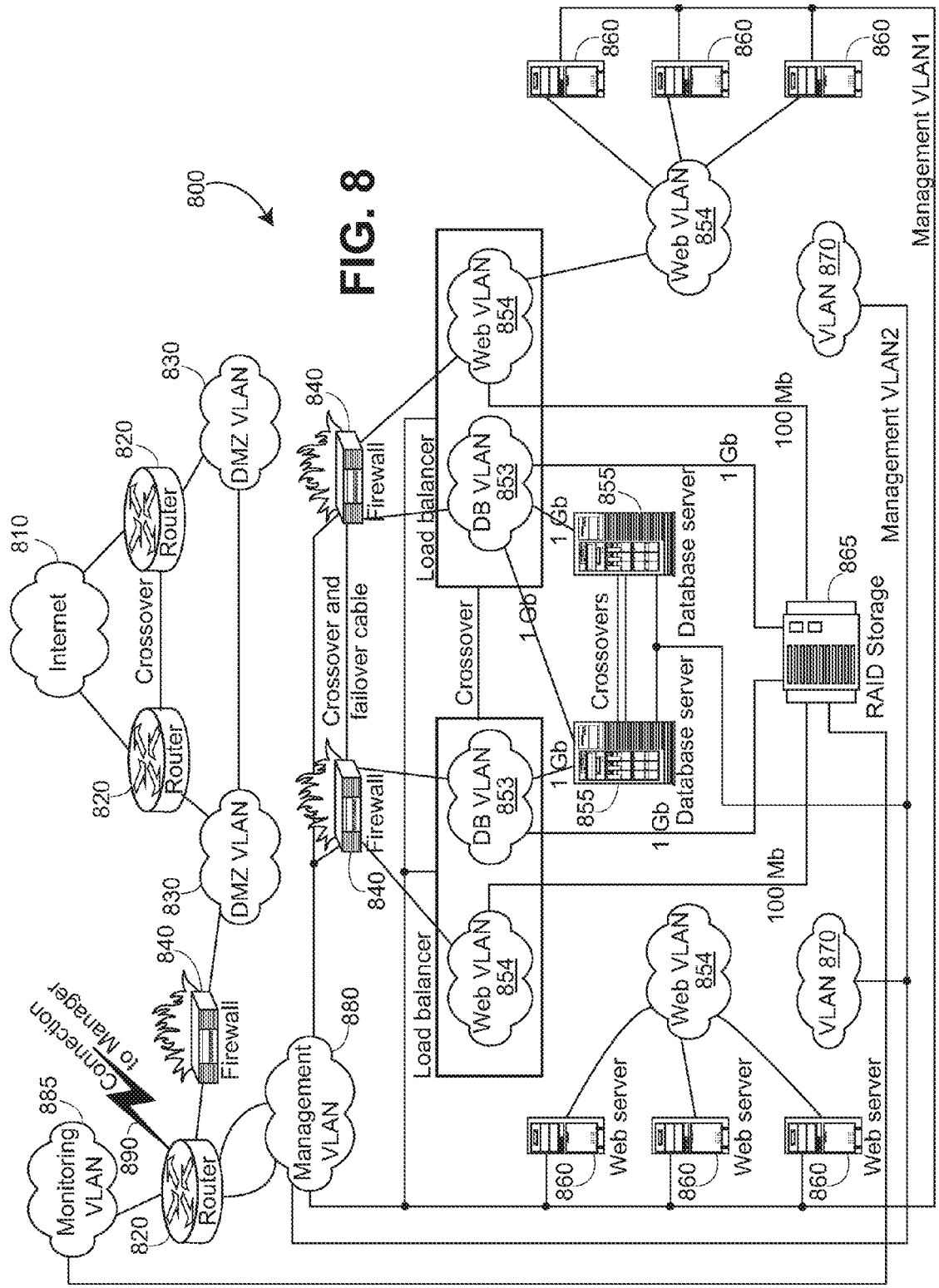
FIG. 8 illustrates a distributed system.

The system and method of the invention may alternatively be practiced in a distributed system, and one such distributed system, generally designated 800, is shown in FIG. 8. The distributed system 800 uses the internet 810 and includes routers 820, demilitarized zone virtual LANs (DMZ VLAN) 830, firewalls 840, load balancers that each include database a (DB) VLAN 853 and a Web VLAN 854, one or more other DB VLANs 853 and Web VLANs 854, database servers 855, Web servers 860, RAID storage 865, VLANs 870, a management VLAN 880, a monitoring VLAN, and a connection 890 to a managing entity. Various elements are disposed in a mirrored and redundant architecture. Monitoring VLAN 885 and Management VLAN provide control of the distributed system 800. It will be understood by those in the art that various distributed architectures, not just that shown in FIG. 8, may be used.

Figure 2:
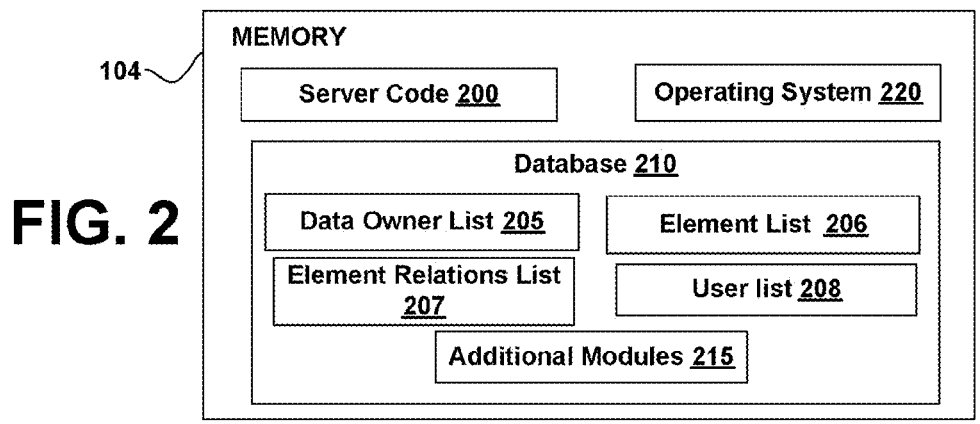
FIG. 2 illustrates system components located in memory 104.

As illustrated in FIG. 2 memory 104 includes a server code 200 and a database management system that in one embodiment is a relational database management system (RDBMS) that maintains a database 210. The RDBMS may be incorporated in the database 210, or may be part of server code 200. Server code 200 includes a variety of application code supporting a plurality of applications. Memory 104 also stores an operating system 220 such as Microsoft Windows NT®, Linux®, or Sun Solaris® that is capable of supporting server code 200, and the database management system maintaining the database 210. Database 210 includes a data owner list 205, an element list 206, and an element relations list 207. Database 210 optionally includes a user list 208 and none or more additional database modules 215. Elements within additional database modules 215 are stored separately or combined in a variety of data structures.

Database 210 optionally is a distributed database and may be located at one or more locations, e.g., on a distributed system such as system 800.

As described in more detail below, the data owner list maintains information about one or more owners. An owner is an entity that may own one or more BOMs stored in database 210. The element list 206 is the list of items that may be in the BOMs. Thus, element list 206 is a list of items, each of which may be represented as a node in a tree representing a BOM. The element relations list 207 describes the relationship between items, i.e., elements in element list 206, in the one or more BOMs. Thus, element relations list 207 describes the structure of the BOMs stored in database 210. The user list describes the users of the system who may have one or more types access to the data in the BOMs.

Element list 206 lists individual items that may be in at least one BOM. Such an item can be a physical element, or can reference a set of steps or operations. Such an item can itself be a BOM. Examples of possible elements within element list 206 include custom mechanical operations such as injection molding, extrusion, and stamping; standard mechanical components such as fasteners and O-rings; printed circuit boards; standard electrical components such as resistors and capacitors; programmed electrical components such as ROMs and ASICs; and the like.

According to one aspect of the invention, multiple lists of elements from multiple BOMs associated with multiple users or companies can be combined in element list 206. Additional parameters related to each element are also stored in association within element list 206. For example, a single element can have an associated description, user and vendor part numbers, cost per item, owner including which company placed the item in the element list 206, and other information.

In one embodiment, owner information is included in the element list 206. Such owner information is particularly important because it enables server code 200 to limit access to particular elements of list 206 to owners of the particular elements, and in one embodiment, also to the owners' respective designates. An "owner" is either a single user or an enterprise. In this disclosure, the term "user" refers to either a single user or a group of users. The subset of element list 206 owned by a user is referred to as the user's "private element list."

In one aspect of the invention, data of database 210 may be grouped together into a "workspace." In one embodiment, each workspace has an owner, i.e., an entity such as a company. One embodiment includes some common data provided for convenience, e.g., common conversion factors and currency data, that is made available to all workspaces. The private element list is the subset of element list 206 within the workspace of a user designated by the owner of the workspace.

In one aspect of the invention, server code 200 when running provides access to database 210 only to users represented in user list 208. In yet another aspect, server code 200 provides access to database 210 only to users represented in data owner list 205. For each user permitted to access database 210, server code 200 identifies data owners represented in data owner list 205 for which the user has been granted access rights.

Element relations list 207 provides data describing the relationships in one or more BOMs between various items in element list 206. For example, in one BOM, a first element (or parent element), e.g., a flange, in element list 206 can include four of a second element (first child element), e.g., four bolts, and two of a third element (second child element), e.g., two strengthening members. Therefore, producing two of the first element, e.g., two flanges, requires the acquisition of eight of the second element, i.e., 8 bolts, and four of the third element, i.e., four strengthening members. Other children may include welding the members, and so forth. Element relations list 207 can be used to represent other relationships such as physical or electrical connectivity or assembly order. In general, element list 206 is used to represent the tree structures of the BOMs, i.e., the hierarchical structure, e.g., with subcomponents filling branches below an element node.

Figure 3:
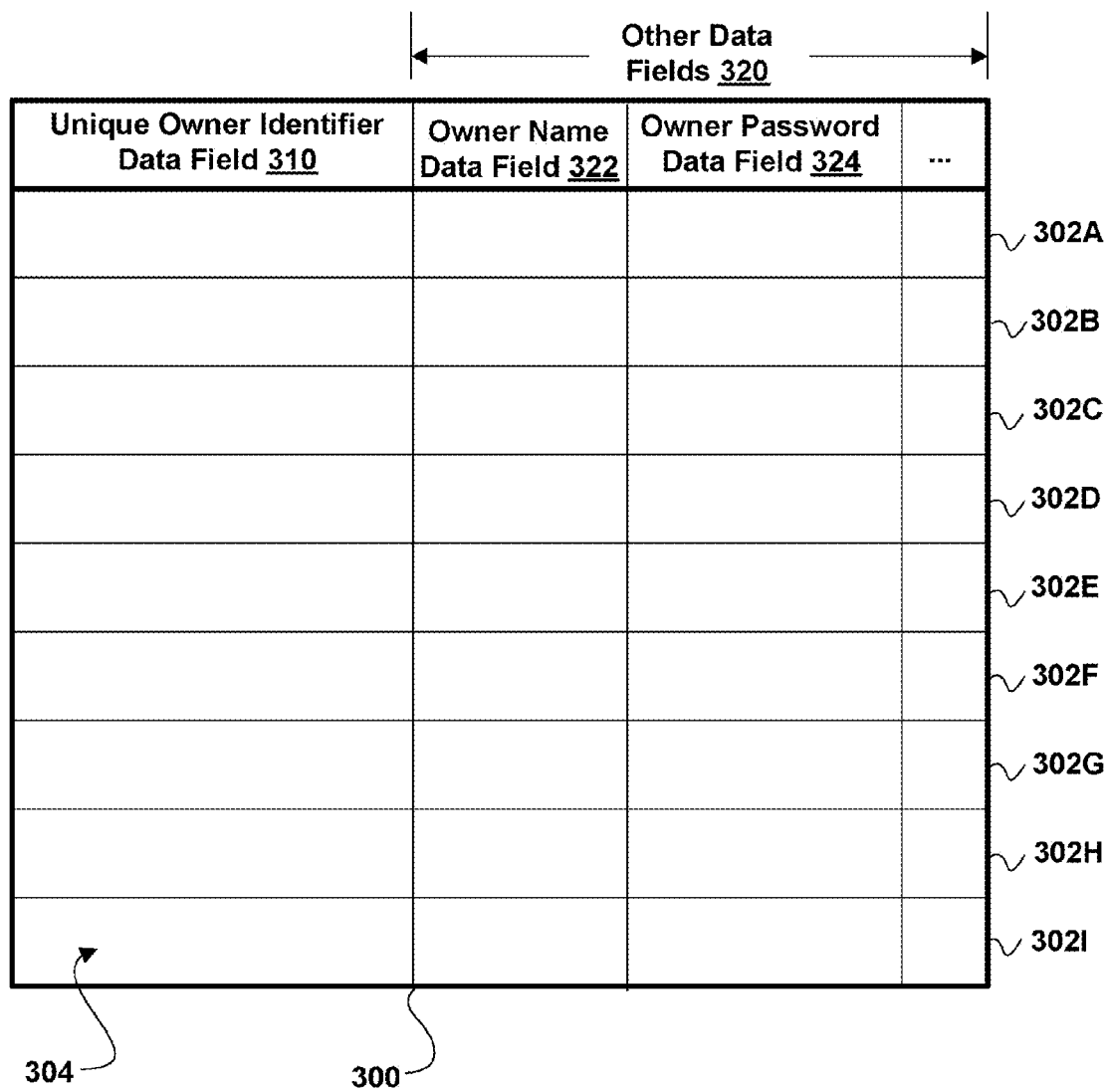
FIG. 3 illustrates an owner list data structure.

The data items in database 210 are stored as one or more data structures that, for the case of the database management system being a RDBMS, are tables. FIG. 3 shows—in simplified form—an owner list data structure 300 for data owner list 205 according to one aspect of the invention. Owner list data structure 300 includes a plurality of data records 302 (rows of the table in the RDBMS case) and typically includes more data records 302 than the simplified form illustrated in FIG. 3. Each data record 302 includes several data fields 304, including a unique owner identifier data field 310. In one embodiment, the contents of unique owner identifier data field 310, called owner identifiers herein, are required to be unique with respect to all other data records 302 of the owner list data structure 300, and can therefore be used to index and uniquely reference any particular data record 302 within the namespace of the owner list data structure 300. In one embodiment, unique owner identifier data field 310 is a primary key for owner list data structure 300. In one embodiment, the namespace of database 210 includes the set of unique owner identifiers. Owner list data structure 300 optionally and typically includes other data fields 320.

Figure 4:
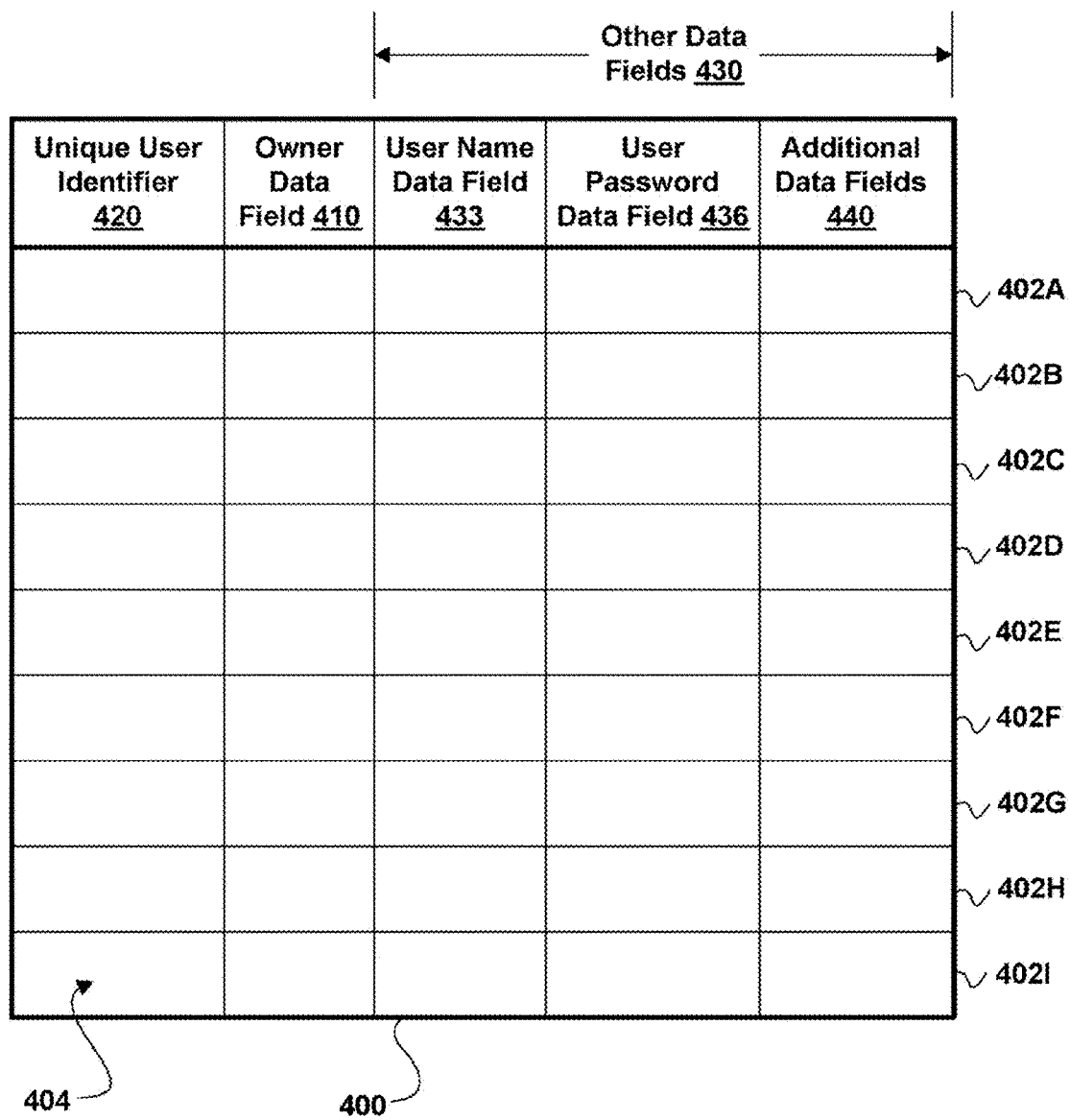
FIG. 4 illustrates a user list data structure.

In one embodiment of the invention, a separate user list is maintained in database 208 for the users. In one relational database embodiment, the data structure for the user list 208 is a table. FIG. 4 shows—in simplified form—such a user list data structure 400 that includes a plurality of data records 402 (rows), typically more than shown in the simplified illustration of FIG. 4. Each data record includes several data fields generally designated 404. User list data structure 400 includes a unique user identifier 425 and in one embodiment, an owner data field 410. Each owner data field 410 contains an owner identifier, and thus matches the contents of unique owner identifier data field 310 in one and only one owner list data record 302 of the owner data structure 300. Thus, owner data field 410 may reference the unique owner identifier data record 310 as a foreign key. The usernames, i.e., the contents of unique user identifier data field 425 are a primary key for user list data structure 400 within the namespace of database 210. User list data structure 400 may and typically does include other data fields 430 such as user username data field 433 and user password data field 436. The user password is for containing a password. Password in this context includes biometric data such as fingerprints or voice print or retinal images or any other data used to identify a user and provide access to data to that user. Additional data fields 440 are optionally added to user list data structure 400 as desired.

In another embodiment of the invention, no separate user list 208 need be included in database 208. In such an embodiment, users and owners are considered identical. Thus the data owner data structure 300 includes as part of other data fields 320 an owner username data field 322 and an owner password data field 324. In this case, user list 208 is typically omitted from database 210.

In one relational database embodiment, the information about items, i.e., the element list 206 is stored as a table. Such a table is illustrated—in simplified form—in FIG. 5 as an element list data structure 500 of element list 206. Element list data structure 500 includes a plurality of data records 502 (rows) and typically includes more data records 502 than shown in the simplified illustration of FIG. 5. Each item has a record in element list data structure 500, and each record has a unique identifier. Each data record 502 includes several data fields generally designated 504. One of the data fields is an element identifier data field 505 that contains a unique identifier for the item. In one embodiment, each record also includes an owner data field 510 that identifies an owner, i.e., that identifies a record of owner data structure 300. Each item is uniquely identified by the item identifier, so that the item identifiers form a namespace, and the element identifier data field 505 is a primary key for element list data structure 500 within the namespace of database 210. Thus, the element identifier data field 505 is also called the element primary key data field. Owner data field 510 references unique owner identifier data field 310 as a foreign key. In one embodiment, each element record also includes a workspace context data field 515, the purpose of which is explained in more detail below.

Each record of element list data structure 500 also includes one or more other data field generally designated 530, including in one embodiment an element name data field 520, in another embodiment an element number data field 525, and in yet another embodiment, both fields 520 and 525. The element number data field 525 contains an element (part) number for the item associated with the individual data record 502. The element name data field 520 includes further identifying information regarding the item associated with the data record 502. There typically are other data fields. For example, there may be a unit of measure data field, a price data field, a quantity at hand data field, and so forth. Users of the system may create additional data fields.

Figure 6:
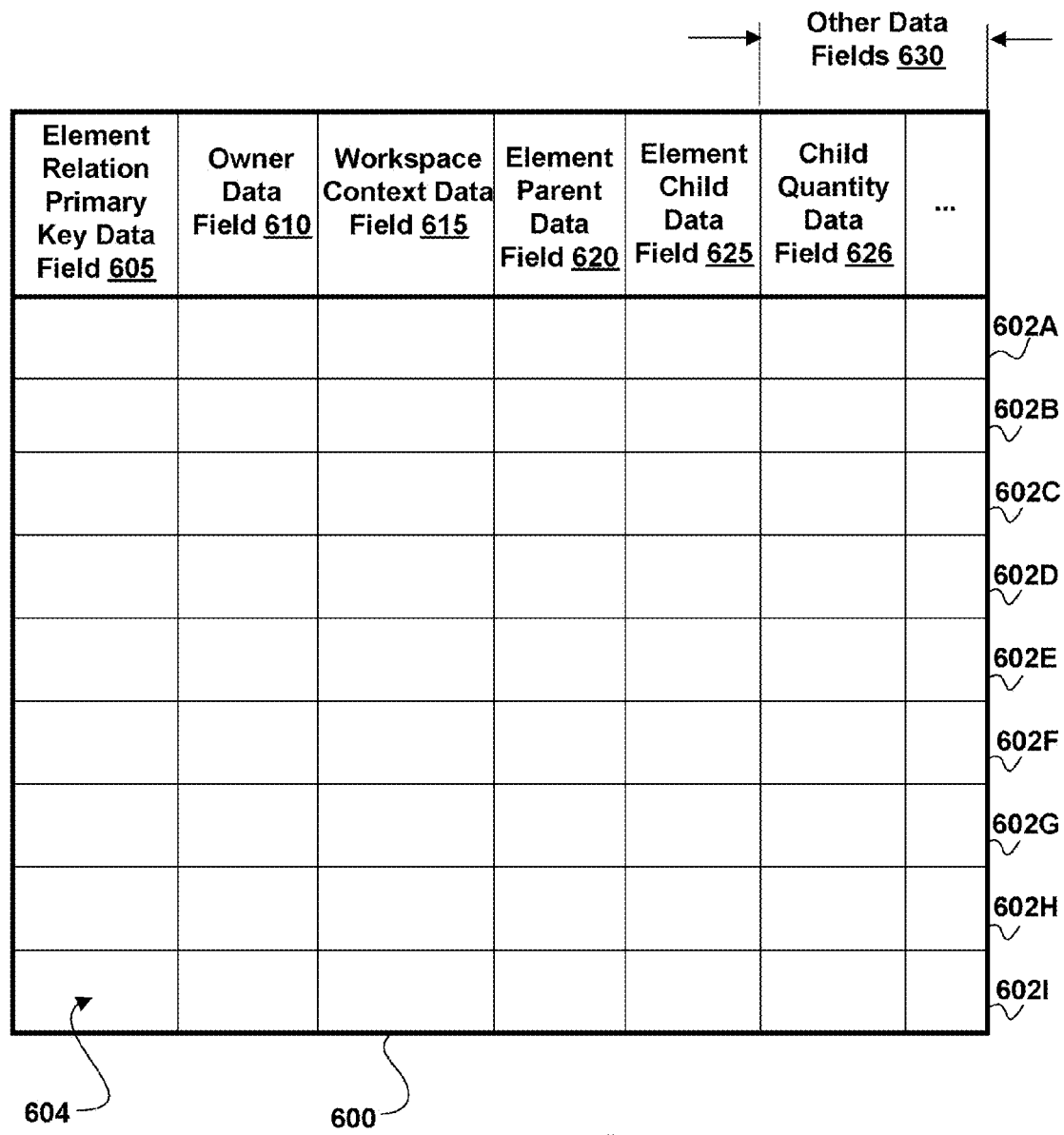
FIG. 6 is an illustration of an element relations list data structure.

In one relational database embodiment, the information that relates items to other items, i.e., the element relations list 207 is stored as a table. Such a table is illustrated—in simplified form—in FIG. 6 as an element relations list data structure 600 of element relations list 207. Element relations list data structure 600 includes a plurality of data records 602 (rows) and typically includes more data records 602 than are shown in the simplified form of FIG. 6. Each data record 602 includes several data fields generally designated 604. In one embodiment, each element relation record in data structure 600 has a unique identifier. In such an embodiment, the unique identifier of each record is maintained in an element relations identifier data field 605. In the relational database embodiment, this field can be a primary key for the table. Thus, as shown in FIG. 6, the element relations identifier data field 605 is also called an element relation primary key data field 605. Thus, each branch in the tree of each BOM has a unique identifier. Each record of data structure 600 further includes an element parent data field 620, and an element child data field 625. In one embodiment, an owner data field 610 also is included. Element parent data field 620 contains a reference to one of the records of the element data structure 500. Element parent data field 620, for example, references element identifier data field 505 as a foreign key. For any record that has a child, element child data field 625 also references an item of the element data structure 500, e.g., by referencing the element identifier data field 505 as a foreign key. Owner data field 610 defines the owner of the relationship e.g., as a reference to a record of the owner data structure 300, e.g., by referencing unique owner identifier data field 310 as a foreign key.

Figure 5:
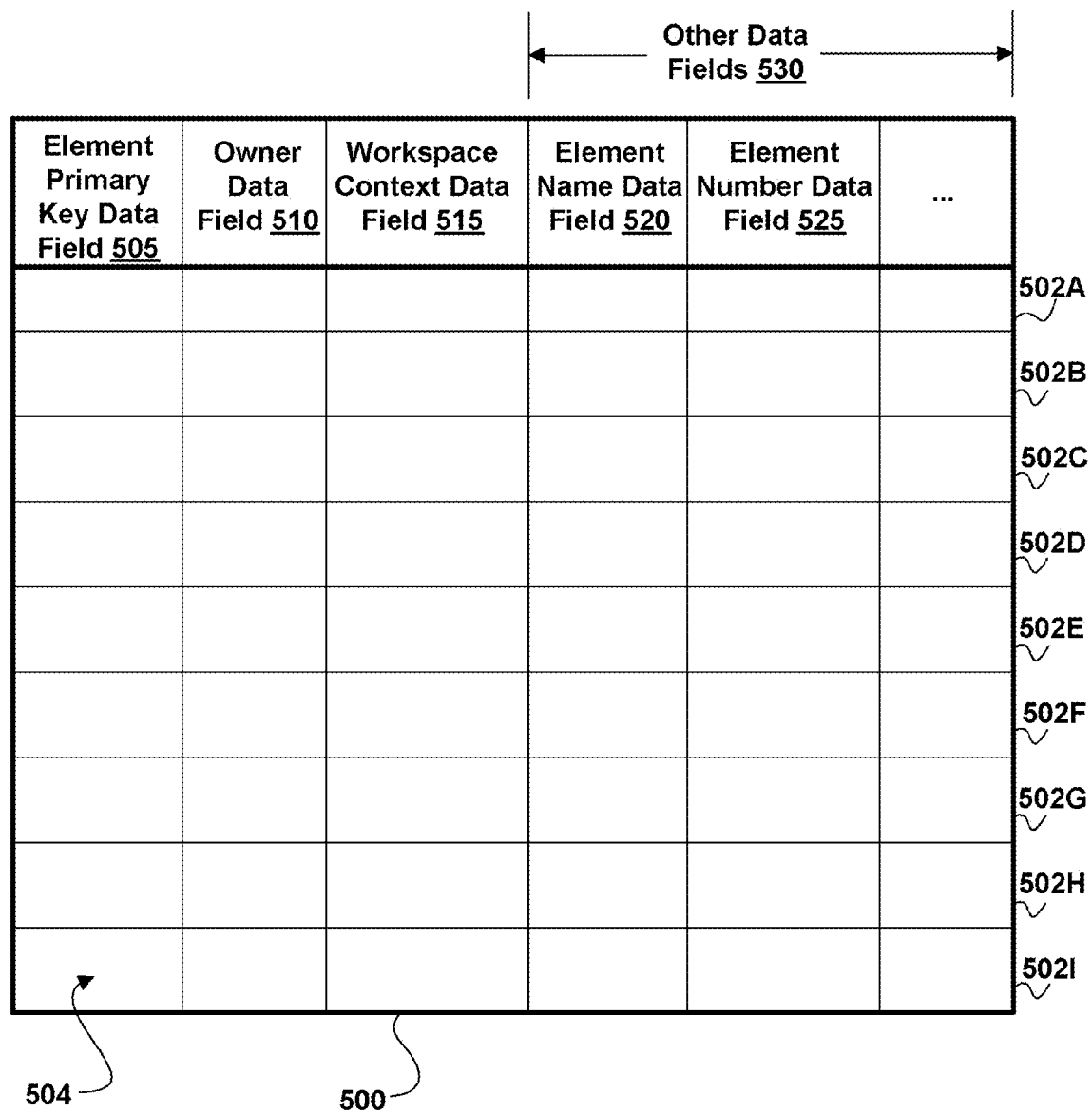
FIG. 5 is an illustration of an element list data structure.

Element relations list data structure 600 is used to represent BOM relationships between items of the one or more BOMs stored in the database. Such items are elements represented by data records 502 in element data structure 500. For example, suppose data record 502A (FIG. 5) represents a BOM or an item in a BOM, and that BOM or item has at the next level a BOM element represented by a data record 502B (FIG. 5). This might be represented in element relations data structure 600 by a data record 602A would contain a reference to data record 502A in element parent data field 620, and a reference to data record 502B in element child data field 625. Thus table 600 describes the parent of any item if a parent exists, and the one or more children of any item if the children exist. Each BOM would have the same owner. A BOM is describable as a tree. The root of the tree is the base item of a BOM. When a parent item and a child item are referenced in a single record of element relations list data structure 600, this indicates that the parent item contains the child item in its BOM. An item that has no children, i.e., a leaf item, is a single component, process, or document that contains no further items.

Thus, by creating one data record 602 for each BOM element relationship included in a bill of materials, i.e., for each link of the tree of the BOM, it is possible to capture structured, multi-level bill of materials relationships between BOM elements.

Various applications of this method will be apparent to those skilled in the art. For example, element relations list data structure 600 optionally includes other data fields 630 in addition to element parent data field 620 and element child data field 625. In one embodiment, other data fields 630 include child quantity data field 626, which contains a number indicating how many of the child BOM elements are included in the parent BOM element, i.e. a record of data structure 600. Users of the system may typically specify the other data fields 630. Also shown in FIG. 6 is optional workspace context data field 615, the purpose of which is explained below.

Figure 7:
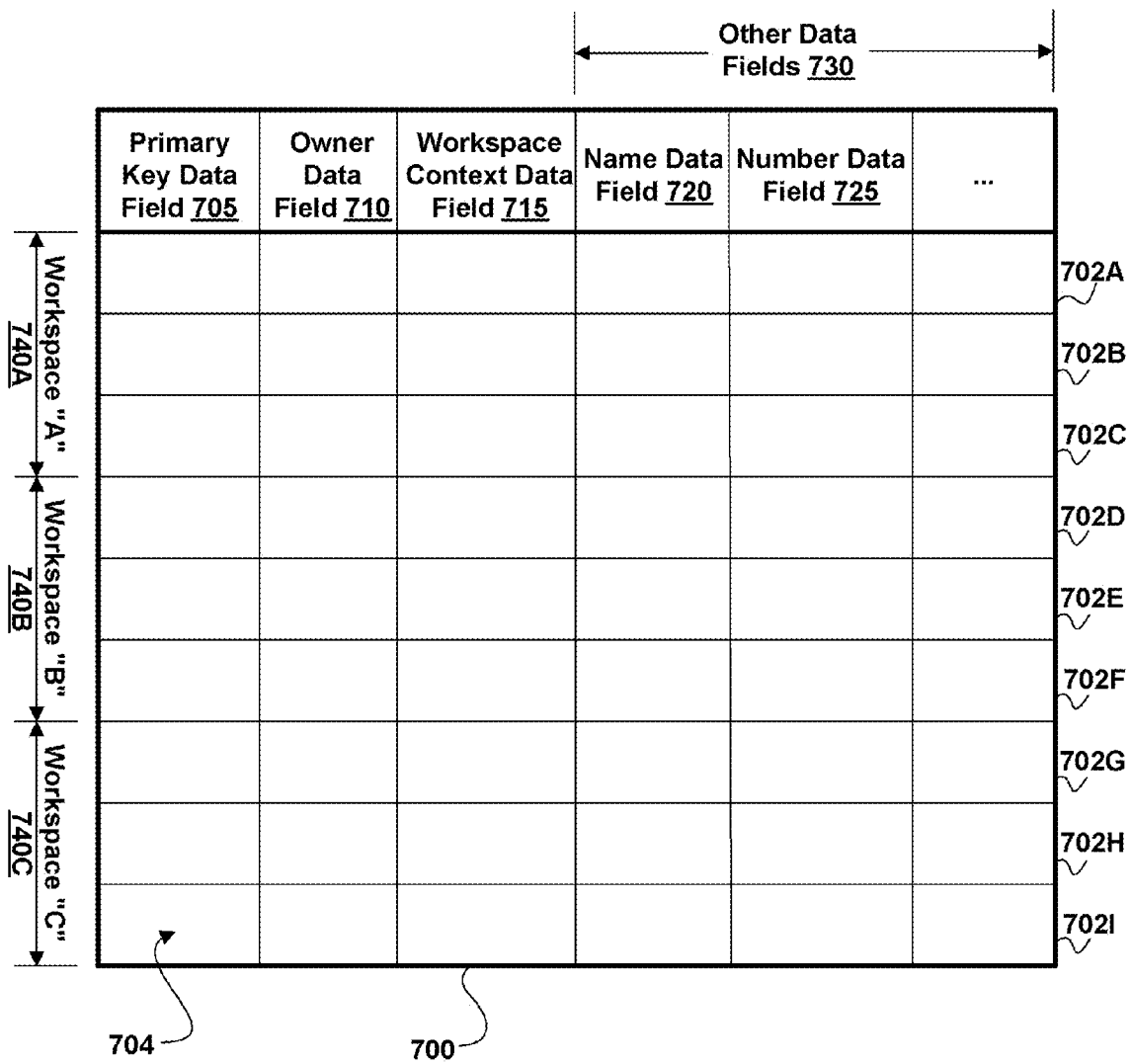
FIG. 7 illustrates a generalized data structure.

One embodiment further includes additional data in database 210. In one relational database embodiment, such additional data is stored in a table. FIG. 7 is a simplified illustration of a generalized data structure 700 for such additional data. Generalized data structure 700 includes a plurality of data records 702 (rows) and typically includes more data records 702 than are shown in the simplified representation shown in FIG. 7. Each data record 702 includes several data fields generally designated 704. In one embodiment, generalized data structure 700 includes a data field 705 for a unique identifier of each record. In the relational database embodiment, this unique identifier data field 705 may be used as a primary key for generalized data structure 700, and thus is called the primary key data field 705 in FIG. 7. One embodiment further includes an owner data field 710 for each record that may reference an owner for the record. In one embodiment, the contents of owner data field 710 is one of the unique owner identifiers of identifier data field 310, and thus in a relational database embodiment, identifier data field 310 references table 700 as a foreign key. At least one other data field 730 is used for other data owned by the user or data owner indicated in owner data field 710. In one embodiment, generalized data structure 700 also includes a workspace context data field 715. One embodiment further includes, as part of the other data fields 730, an element name data field 720. One embodiment further includes an element number data field 725. Other or alternate data fields such as vendor identifier data fields, and so forth may be included.

In one embodiment, generalized data structure 700 is used to store all data within memory 104 that is owned by an entity represented in data owner list 205. In one aspect, a user referenced by a particular data record 402 in user list data structure 400 is granted access by application code 200 to all data stored in various instances of generalized data structure 700 for which the contents of the owner data field 710 in generalized data structure 700 match the contents of the user's named owner data field 410 in user list data structure 400. In other aspects, server code 200 uses a more complex algorithm to determine a list of one or more data owners represented in data owner list 205 for which a user represented in user list 208 has been granted access rights (the user's access list).

Server code 200 interacts with database 210 to restrict users to viewing and editing data stored in generalized data structure 700 for which the data owner referenced in owner data field 710 is included in the user's access list. In addition, when a user creates a new data record 702 in any particular instance of generalized data structure 700, server code 200 interacts with database 210 to automatically set the contents of owner data field 710. In another aspect, the contents of owner data field 710 are set to match the contents of the user's named owner data field 410 in user list data structure 400. In other aspects, server code 200 uses a more complex algorithm to set the contents of owner data field 710.

In another aspect of the invention, a workspace is defined as a set of data of database 210 having the same owner. For example, data records in data structure 700 with a common owner may be considered part of that owner's workspace. Thus, data records 702 of generalized data structure 700 may be grouped by owner data field 710. The set of data records with a common owner is considered part of that owner's one or more workspaces. The workspace is identified in table 700 by the contents of workspace context data field 715. FIG. 7 shows data records 702A, 702B, and 702C as being included in a workspace "A" 740A. Thus, all these records would reference the same owner in their respective owner data field 710 and the same workspace ("A") in their respective workspace context data field 715. Likewise, data records 702D through 702I are divided between workspace "B" 740B and workspace "C" 740C. Each of these workspaces typically but not necessarily has a different owner. That is, one owner may in general own more than one workspace. For simplicity, the case of each owner having one workspace is described herein. Owners have control of rights and preferences within their workspaces. They can delegate rights, add records, and delete records. Owners determine what information within their workspace is available to other users and owners. The division of BOM data into individual private workspaces under a single namespace enables significant utility.

Generalized data structure 700 is optionally used within many of the lists and files in database 210 and is not restricted to use with data that includes BOM elements. For example, in various aspect of the invention, generalized data structure 700 is used to facilitate the storage of vendor lists, shipment lists, transaction lists, and other data related to various aspects of the invention.

Inclusion of an owner data field in generalized data structure 700 enables the aggregation of data from multiple owners, within a single namespace, in each list in which generalized data structure 700 is incorporated. An owner's workspace can include any of these aggregations and can reside in files storing BOM elements, vendors, transactions, and/or other related data.

Optional workspace context data fields 715 in generalized data structure 700 are used to store data indicating the context in which other data within the data record 702 is to be interpreted. For example, while the element identifier of an item is unique in database 210, it is common for two different users to use different element numbers for the same element. In one aspect data within the workspace context field 715 identifies a user whose element number is used in the element number data field 725. This user can be different from the user that owns the record 702 that includes the element number data field 725. The ability to define context enables owners to make proxy representations of data owned by others. Element numbers can be aliased to reconcile differences in element numbers used by different parties.

The other data fields may include one or more identifying fields in addition to or as an alternative to the data fields 720 and 725 shown in FIG. 7. For example, when generalized data structure 700 is used to facilitate the storage of a vendor list element, a vendor identifier data field may be included.

In one embodiment, database 210 includes additional database modules 215. Not all embodiments include these additional database modules 215. In a relational database embodiment, one or more additional tables may represent the additional database modules.

Figure 9:
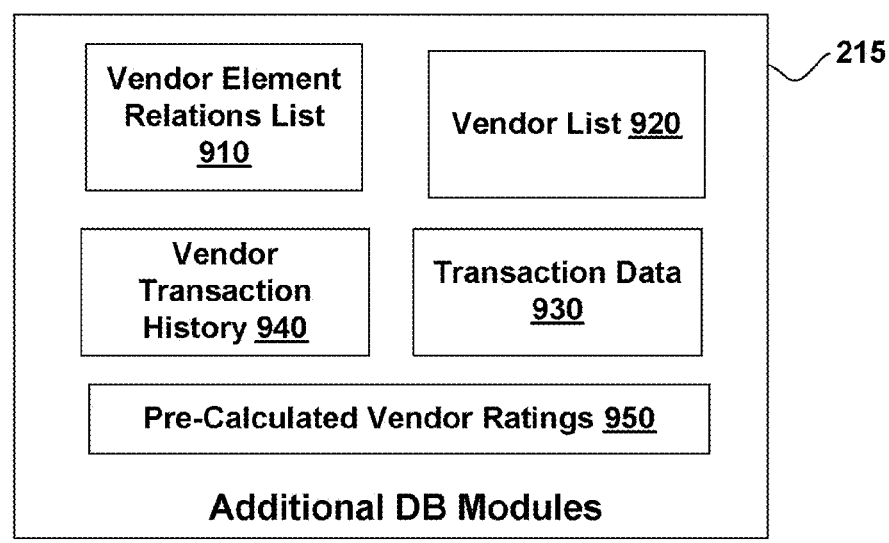
FIG. 9 is block diagram illustrating RDBMS modules.

In one embodiment, the additional database modules 215 include, as shown in FIG. 9, a vendor list 920, n vendor element relations list 910, transaction data 930, vendor transaction history data 940, and pre-calculated vendor ratings data 950.

In one embodiment, the vendor list 920 is a subset of data owner list 205 so that vendor list contents are represented by records in the owner data structure 300. In another embodiment, the vendor list 920 is maintained separately from data owner list 205, so that a separate data structure is used to represent the vendors.

Vendor list 920 includes data related to vendors for elements in element list 206. Vendor list 920 also optionally includes, for each vendor, vendor identification data such as one or more of vendor name, vendor contact information, and vendor identification number. Vendor element relations list 910 includes data delineating which vendors, of vendor list 920, supply BOM elements of element list 206. Vendor element relations list 910 describes the sourcing relationship between an item in the element list 206 and a supplier in the vendor list 920. Vendor element relations list 910 optionally further includes information about the quantity of each element that the referenced vendor can supply. For example, a vendor is able to supply up to 1,000 of an element per month with a minimum order of 500 units. In contrast, a second vendor is willing to supply lower quantities, perhaps for use in the conceptual or design phases of a user's product. Further, a third vendor is a manufacturer and has the ability to deliver vast quantities of the element. A vendor may be a reseller that resells an element in lower quantities, or a manufacturer that produces an element and supplies it to a client. Vendor element relations list 910 optionally includes, for each vendor element relation, data indicating whether the vendor is a reseller or a manufacturer.

In one embodiment, user list 208, and thus the user data structure 400 includes data to associate one or more users with a vendor in vendor list 920. In one aspect of the invention, server code 200 uses this data associating users and vendors in conjunction with vendor element relations list 910 to permit users associated with a vendor to access elements in element list 206 supplied by said vendor. Users typically enter vendor element relationship data into with vendor element relations list 910 in order to facilitate future purchasing of an item of element list 206. The data associating users with a vendor permit users associated with a vendor to gain access to data for one or more BOM elements and related BOM data, and this provides significant utility. In particular, there is a substantial reduction in the amount of work required to administer access to BOM data. In addition, the timeliness and accuracy of the shared data is improved, because the vendor's users gain automated access to the most current BOM data stored in the system.

Transaction data 930 includes information used to support transactions. In one embodiment, the data in vendor transaction history 940 includes the number of each transaction type completed for each vendor. Transactions with vendors may be electronic. Each time an electronic transaction is completed (see below), in one aspect of the invention, the vendor transaction history 940 is updated with a record of the transaction. For embodiments that include pre-calculated vendor ratings data 950, this data 950 includes summaries of such items as the timeliness and reliability of one or more vendors in vendor list 920. In one embodiment, pre-calculated vendor ratings 950 are automatically updated at pre-established intervals or whenever a user requests a vendor rating.

Figure 10:
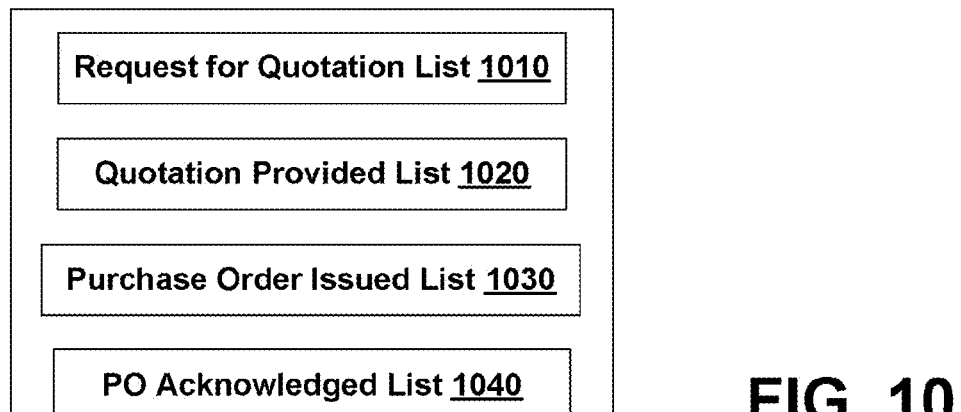
FIG. 10 is a block diagram illustrating optional elements of a vendor transaction history.

FIG. 10 illustrates in simplified form the set of elements of vendor transaction history 940 according to one embodiment. Other embodiments that include vendor transaction history 940 use more or fewer elements as part of data 940. FIG. 10 includes a request for quotation list 1010, a quotation provided list 1020, a purchase order ("PO") issued list 1030, a PO acknowledgment list 1040, a promise to ship list 1050, a notification of shipment list 1060, and a notification of receipt list 1070. In one aspect of the invention, each time a transaction is completed, a relevant list in vendor transaction history 940 is updated.

Figure 11:
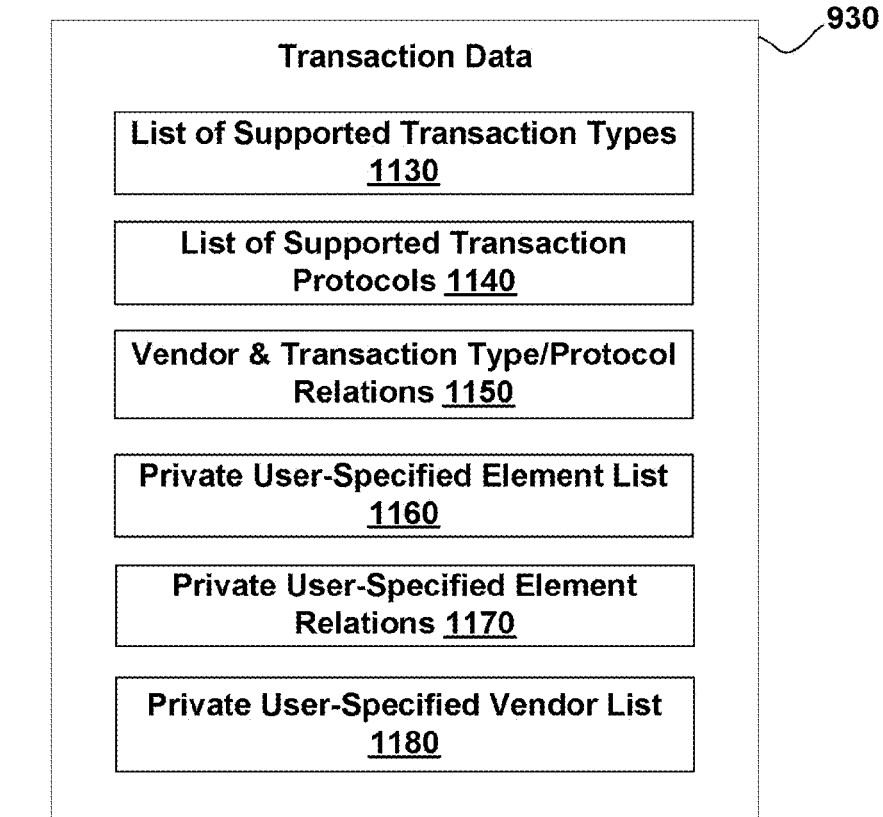
FIG. 11 is a block diagram illustrating elements of transaction data.

FIG. 11 illustrates in simplified form the set of elements of transaction data 930 according to one embodiment. Other embodiments that include transaction data 930 use more or fewer elements as part of data 930. FIG. 11 includes a list of supported transaction types 1130, a list of supported transaction protocols 1140, vendor and transaction type/protocol relations 1150, a private user-specified element list 1160, private user-specified element relations 1170, and a private user-specified vendor list 1180.

Different embodiments of list of supported transaction types 1130 include one or more of transaction types such as element availability inquiries, e.g., inquiries regarding whether a vendor carries an element, manufacturer availability, e.g., inquiries regarding whether a vendor carries elements from a specific manufacturer, quantity of elements "available to promise," e.g., the quantity of items in stock and unordered, price request for a specific quantity of items, price schedule as a function of quantity, lead time request for a specific quantity, lead time as a function of quantity, requests for quotation, quotation provided, e.g., from vendor to user, purchase order issued, e.g., from user to vendor, PO acknowledged, e.g., from vendor to user, promise to ship, e.g., from vendor to user, notification of shipment, e.g., from vendor to user, notification of receipt e.g., from user to vendor, and so forth.

Different embodiments of supported transaction protocols 1140 include one or more of fax, e-mail, e-mail containing the URL of a Web form for entering vendor response, Rosettanet—a non-profit organization (www~dot~rosettanet~dot~org, where ~dot~ denotes the period "." in the actual URL) that seeks to implement standards for supply-chain transactions on the Internet, Electronic Data Interchange (EDI), postal mail interface, manual protocols such as voice telephone calls, and the like. These protocols are implemented by system 100 or distributed system 800, and associated with interfaces described below with reference to FIG. 18.

In one embodiment, vendor and transaction type/protocol relations 1150 a list of vendors and vendor protocols associated with items in element list 206. The vendor and transaction type/protocol relations 1150 include the vendors that can supply an item and which protocol to use for each transaction type with each vendor when requesting the element.

In one embodiment, private user-specified element list 1160 is a subset of element list 206 with access control so that each enterprise or user can only see selected elements. The user can transfer elements to private user specified element list 1160 from element list 206, thereby eliminating the need to enter specification data for each element. In one aspect of the invention, private user-specified element list 1160 includes some elements not included in element list 206. The element list further can include different element numbers assigned by the user, different element names, and different categorizations (se below).

In one embodiment, private user-specified element relations 1170 includes relations that are applicable to private user-specified element list 1160. Private user-specified vendor list 1180 optionally includes a list of at least one vendor for each of the elements in private user-specified element list 1160. Private user-specified vendor list 1180 is generated by the user and is only accessible by the user or his designates. Private user-specified vendor list 1180 optionally makes reference to vendors listed in vendor list 920 and optionally includes new or unknown vendors.

Figure 12:
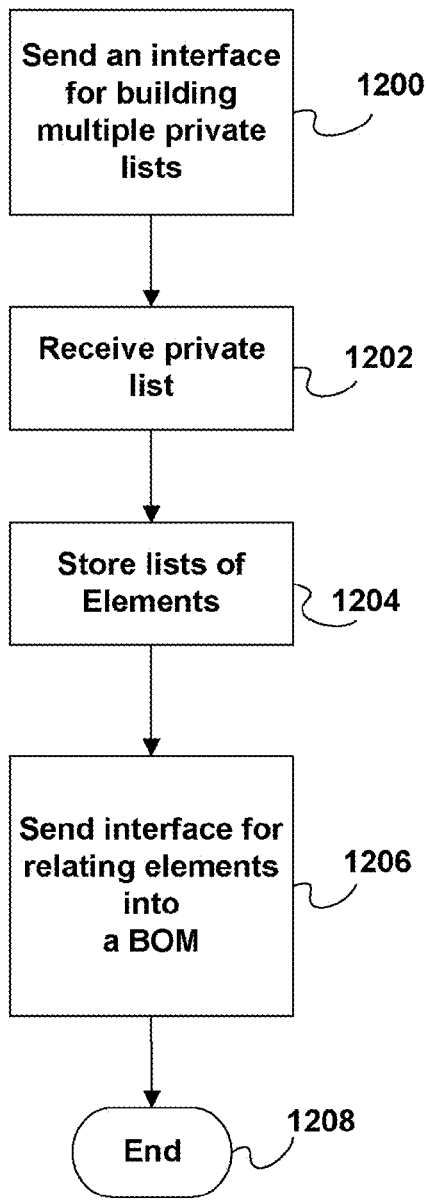
FIG. 12 is a flowchart of steps according to an aspect of the invention for creating and storing a BOM in an RDBMS.

FIG. 12 is a flowchart of steps according to an aspect of the invention for creating and storing a BOM in database 210. At a step 1200 server code 200 sends to a user via a computer network such as the Internet using protocol for sending Web pages, an interface—as a Web page—for building multiple private lists of uniquely identified purchasable or non-purchasable elements. Non-purchasable elements include, for example, a test point on a printed circuit board or manufacturing step. The user displays and operates the interface on a remote computer via Web browser software such as Netscape Navigator® and Microsoft Internet Explorer®, or other conventional method.

At a step 1202, server code 200 receives from the user at least one private user specified element list 1160 of identified elements (uniquely identified for that user), the elements' attributes, and the elements' relationships to each other, i.e. parts of one or more BOMs. Each of the elements may be a process, a mechanical component, an electrical component, or any other uniquely identifiable element required for the building of a product. Attributes or properties of the elements include quantity of the element required to produce a product or subassembly, part number, and description.

At a step 1204, the RDBMS for database 210 stores any or all of the elements within private user-specified element list 1160 and their attributes in element list 206, if such elements are not already included in list 206. The RDBMS for database 210 stores, under user instruction, relations between the elements (such as parent-child relationships) in element relations list 207. Further, the RDBMS for database 210 stores vendor and/or manufacturer information for each element in vendor list 920, typically as a result of user input.

In one aspect of the invention, elements from multiple BOMs from multiple users are stored together in the element list 206, e.g., in table 500. These users may "own" BOMs or workspaces that include private user specified element lists. These users, through ownership, control access to and manipulation of data within those BOMs. For example, in one embodiment, multiple companies can add elements in element list 206 while only those elements introduced or owned by a specific user may be edited by that user. The user can provide a variety of access privileges to other users such as other employees of the same enterprise.

One embodiment of the invention provides for creating a BOM from the list of publicly accessible items. In the master item list, there may be items to which access is not restricted. Such items are called public items. One aspect is the incorporation of such public items into a user's BOM. For example, it may be desirable for an owner to build a BOM wherein as many as possible of the elements are easily obtainable as indicated by the items being public. At a step 1206, server code 200 sends an interface to a user via the Internet, or similar communications means, for relating elements from element list 206 into a private user specified element list 1160 or private BOM (in element relations list 207 as kept in table 700). In one aspect the user builds and accesses a list of public elements that are accessible by all users and incorporates and relates those public elements into a BOM. The BOM is presented as a fully nested view with user-selectable expansion of subassemblies/levels. Further, the BOM is expandable down to a specified level or alternatively only a specific level can be viewed. The interface also allows flattened and component viewing. At a step 1208, the method terminates. Vendors optionally provide elements to element list 206 for public access. The user-specified element list 1160 or the BOM can be loaded into the workspace 340 of the user within the database 210.

Figure 13:
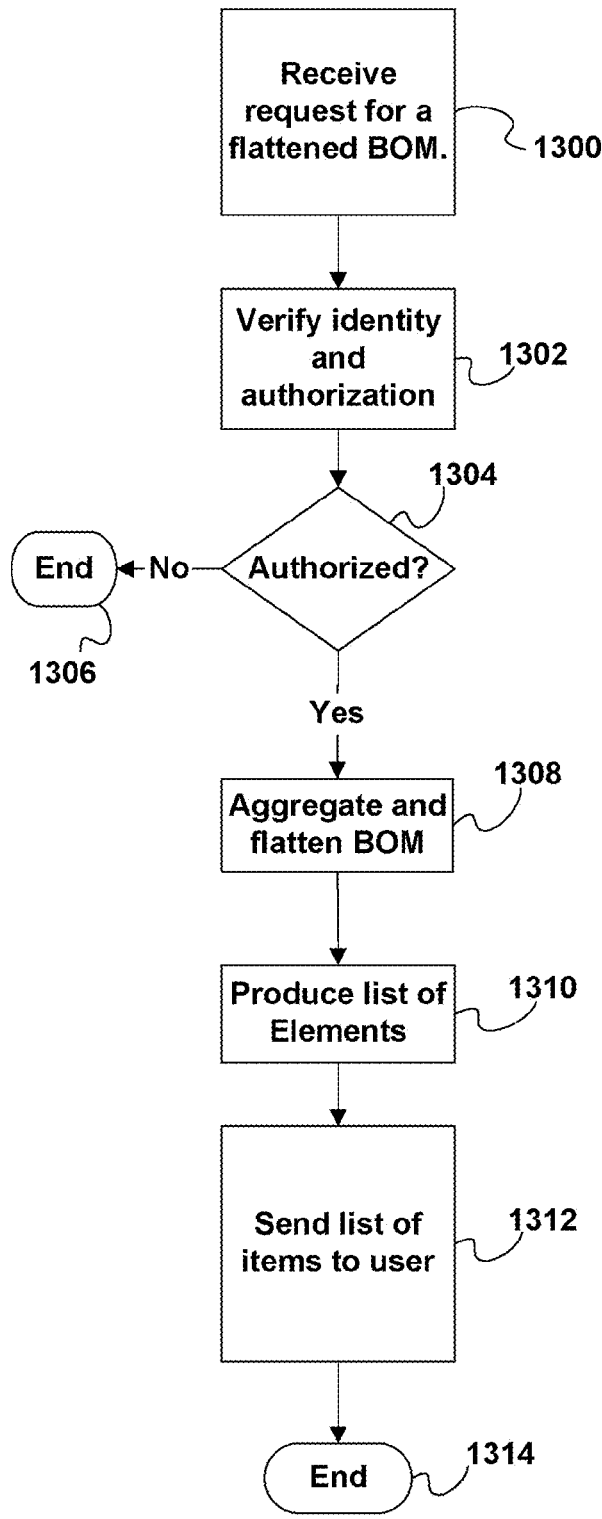
FIG. 13 is a flowchart of steps according to an aspect of the invention for sending an aggregated and flattened BOM to a user.

FIG. 13 is a flowchart of steps according to an aspect of the invention for sending an aggregated and flattened BOMs to an enterprise. A BOM may be extracted as from the element relations list 207 stored as data structure 600. Each individual BOM is representable as a single disjoint tree. Once a BOM is extracted, flattening a BOM includes removing the structural and relational information. A flattened BOM is presented as a list of parts without visualization of parent-child relationships. Aggregation of a BOM includes collection and counting of identical elements in one BOM. For example, if a part is used four times in a BOM it may have four separate entries in a non-aggregated view. However, in an aggregated view these parts may be referenced once with a "quantity" descriptor equal to four.

Flattening and aggregation may be applied to a subset of a BOM. The operations may also be performed to support pre-computed views.

At a step 1300, server code 200 receives a request from a user to send a flattened BOM. At a step 1302, server code 200 optionally verifies the user's authority to access the BOM that he has requested. At a step 1304, server code 200 verifies the user's authorization by confirming that a user-entered password matches the password listed in user/enterprise list 205. In alternative embodiments, server code 200 verifies the user's authorization via another means for confirming identity. Such other means may be one or more of fingerprint matching, or retinal scanning or another biometric technique, or another non-biometric technique. If the user is not authorized to access the BOM, the method ends at a step 1306. Alternatively, the user is prompted to reenter his or her password. Further, in one embodiment, the user is locked out of the BOM if he fails to enter the correct password multiple times in a pre-specified time period.

If the user is authorized to access the requested BOM, then at a step 1308 the RDBMS for database 210 aggregates and flattens the user's BOM. Step 1308 includes the RDBMS for database 210 identifying the BOM and which items in element list 206 are parts of the user's BOM using the element relations data 207 (table 600) and matching the user identifier if the owner data field 310 associated with each element in the BOM. Step 1308 includes extracting the BOM information from the element relations data 207 (table 600) and flattening and aggregating the BOM. At a step 1310, the RDBMS for database 210 produces a list of BOM elements that include the aggregated and flattened BOM data. This list may be divided by or limited to purchasable or non-purchasable elements. At a step 1312, server code 210 sends the list to the user and the process ends at a step 1314.

The unique aspect of having a collection of multiple BOMs from multiple users, organizations, or companies within a single system, and the relationships among elements, provide several aspects of the invention. These include automated development of vendor lists, enhanced calculation of system costs, improved element classification, vendor ratings, electronic transaction processing, and targeted advertising based on elements within a BOMs. These aspects are disclosed in detail below.

Development of Vendor Lists

In one aspect of the invention, the data in database 210 including element list 206 is used to generate one or more vendor lists, e.g., primary or alternative vendor lists for elements. Since element list 206 typically includes data submitted by a plurality of users, when a user selects an element for inclusion within one of his or her BOMs, there is a possibility that the same element has already included in a BOM owned an entity other than that of the user. Computer code operating within system 100, e.g., part of server code 200 disaggregates multiple BOMs in the element relation list 206 (in table 500) and/or element relation list 207 (in table 600) owned by multiple owners into individual elements, remove proprietary information from the data of the elements, and then compiles the non-proprietary information into a database of sources for the elements. The database of element sources allows computer code operating within system 100, e.g., server code 200 to recommend sources for elements when a user creates a new BOM. Sourcing recommendations are keyed by manufacturer name, vendor name, part number, or the like.

A BOM and/or data about the elements in a BOM may include multiple interchangeable sources for one or more of the BOM elements. In one embodiment, vendor data for an owner is stored in the vendor list 920 and the vendor element relation list 910. A user can indicate one vendor of an individual element as the "preferred" source, and maintain information about other "alternative" vendors in case the preferred sources are unable to meet the requirements of the user. In one aspect of the invention, sourcing recommendations are provided using such data. In a particular embodiment, non-proprietary sourcing recommendations are provided to one owner based using such data owned by another owner.

Thus, one aspect of the invention is a method of providing sourcing recommendation using data in a database such as database 210 that contains a lists of purchasable elements provided to the database by multiple users or entities. The list of elements is maintained in a single namespace. The database includes information of one or more vendors for at least one element in the element list, e.g., in the form of vendor list 920 and vendor element relations list 910. Suppose an entity, e.g., an entity denoted "A" has an element for which a single source is known, e.g., in that owner's vendor element relations list 910. Because each element is uniquely identified in the element list 206 in the database, it is possible to search the database for other owners who use the same element, or alternately, other elements of the same or other owners that use the same vendor. For example, if the same element appears in some other owner's vendor element relations list 910, there may be one or more other vendors specified by that other owner. The server code can provide to entity A the identity of the alternative sources as an alternative sources recommendation without revealing the identity or any other information about the other owners or any other users. In one embodiment, the same or other elements that have the same vendor are searched in the database. If the same vendor appears in one or more vendor element relations list 910, the server code searches for alternate vendors that may have been provided for any element supplied by that vendor. The server code can provide to entity A the identity of the alternative sources as an alternative sources recommendation without revealing the identity or any other information about any other owners or any other users. Note that in an improved embodiment, users of the system may prefer not to allow their sourcing data to be provided to other users even without revealing identity. In an improved embodiment, the owner is provided with an "opt-out" feature.

Figure 14:
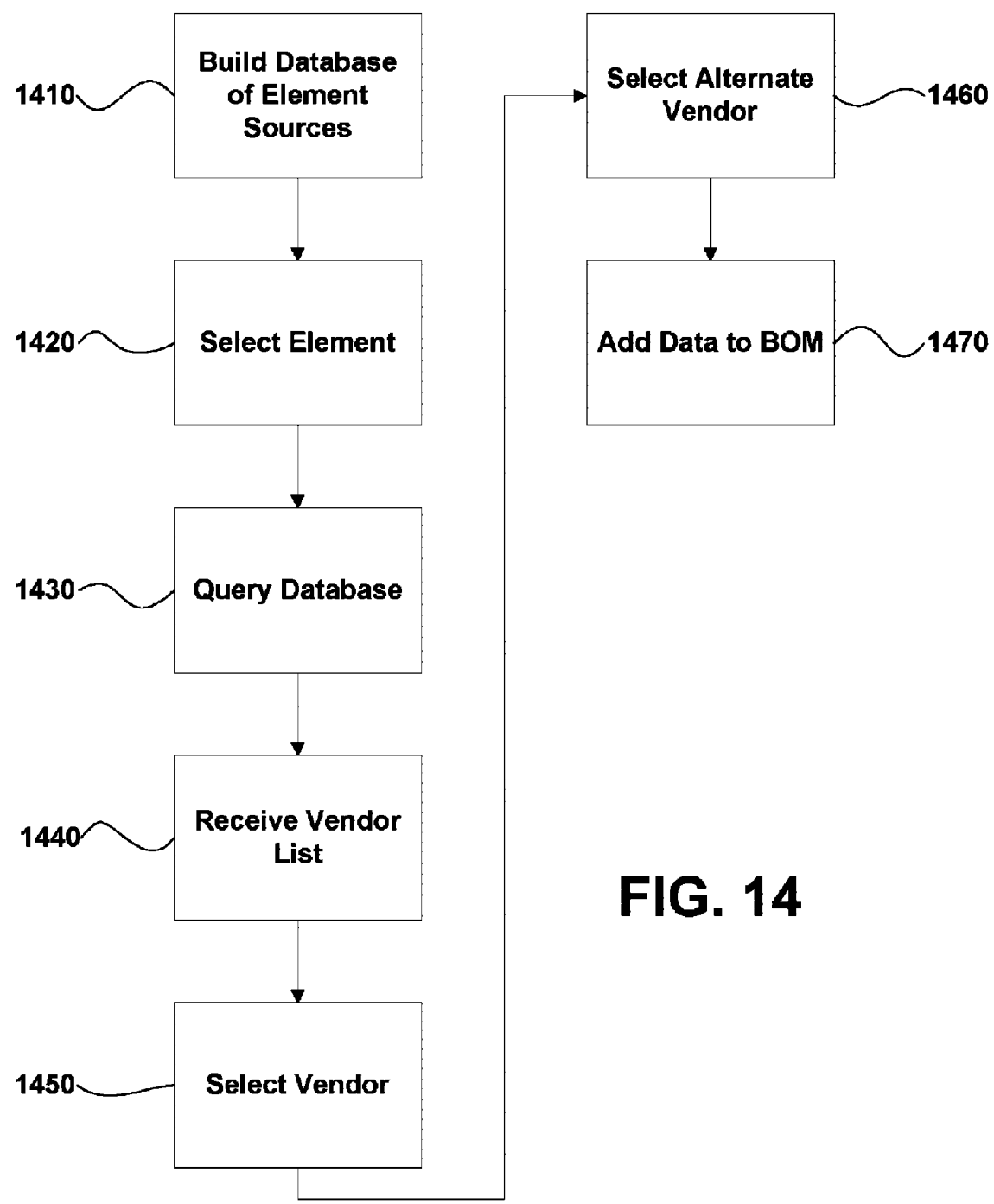
FIG. 14 illustrates steps in an aspect of the invention for developing and using vendor lists.

FIG. 14 illustrates one method embodiment of developing and using of vendor lists. In a step 1410 the vendor-element data in element list 206 is used to build a database of element sources. This for example may be in the form of a vendor list 920 and a vendor element relation list 910. One such set may be provided by each owner or in each workspace. In a step 1420, which occurs before or after step 1410, a user selects an element. In a step 1430 the database developed in step 1410 is queried to find the selected element and returns any available vendor information. This vendor information may have been generated by the user, e.g., in another workspace, one or more other owners, or by one or more vendors. In a step 1440 the server code sends the user and the user receives the results of the query including a source list for the element. In a step 1450 the user selects a preferred vendor for the chosen element. One embodiment includes a step 1460 in which the user is provided the option of selecting secondary vendors for the element. In a step 1470 the selections are added to the workspace of the user, e.g., into that workspaces' vendor element relations list 910.

Calculation of System Costs

Figure 15:
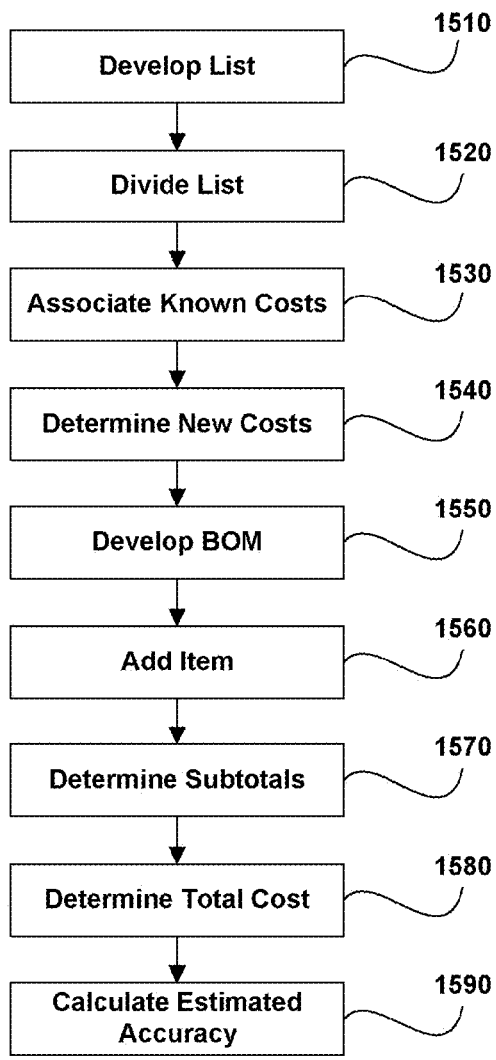
FIG. 15 illustrates steps for determining a cost estimate from the content of a BOM.

In one aspect of the invention, data within database 210 is used for automatically calculating a cost estimate for a product and, in one embodiment, a figure of merit for this calculation. One method embodiment of determining a "rolled up" product cost estimate and calculating the accuracy of the estimate based on a preliminary BOM is illustrated in FIG. 15.

In a step 1510 a list of purchasable or non-purchasable elements to be included in a BOM is developed. This list is generated as one or more BOMs are populated. In a step 1520, the list developed in step 1510 is divided into elements that are already used by the user and newly specified elements. The division occurs as the list is developed or at the request of the user, and the division is optionally updated over time as more elements are introduced or changed. Throughout this process, elements having a known, quoted, or estimated cost are tagged as such. In a step 1530, for each element already used by the user, cost information from previous purchasing records is automatically associated with the element. In a step 1540 a cost estimation or price quotation is attained for each newly specified element. Users select to have quotation requests automatically generated and sent to appropriate vendors. In an optional step 1550 a new BOM is developed and in a step 1560 an element is added to the new BOM or a previously existing BOM. Cost estimates are for single or multiple element quantities. Steps 1550 and 1560 are not necessarily performed immediately proceeding steps 1510 through 1540.

In a step 1570 three separate cost subtotals are calculated for the selected BOM, the subtotal of the elements with estimated costs, the subtotal of the elements with quoted costs, and the subtotal of the elements with known costs. Alternatively, these values are maintained in running subtotals. A count of the quantity of elements in each category is optionally maintained. In a step 1580 the total cost estimate is determined by adding the three subtotals.

In a step 1590 figures of merit for the accuracy of the cost estimates are calculated from the values generated in steps 1570 and 1580 or from values generated through a similar process. At a minimum, these include the percentage of the total cost represented by the estimated, quoted, and known cost subtotals, or the percentage of the total number of elements in each cost category. The perceived accuracy of individual price estimates may be considered in an algorithm used to calculate the accuracy of estimated total costs. The calculated figures of merit are optionally reported to a user.

Element Classification

In another aspect of the invention systems for simplified component type categorization and automating design analysis using said type categorizations are provided. These enable methods of multiple, application specific, hierarchical, and other types of categorizations of product components.

A table of classes or "categories" is maintained in a database as part of database 210. In one relational database embodiment, with each category represented by at least one row within the table. Categories are related to each other in a tree-like structure, wherein each category is a parent to none, one or more child categories or elements (components). Individual categories and elements are also children to none, one, or more parent categories. The relationships between categories in this system are structurally similar to assemblies in BOMs. In one embodiment, the table of categories is combined with an element relation table (BOM) as a single table in a database. That is, each the category of element in a BOM is referenced in the BOM. In another aspect two separate tables are maintained, one of categories and another of components. The relationship between the parent and children categories and components are maintained as a "parent category" column in the category and element table(s). In one embodiment, a separate "category relations" table of category relationships is maintained that describes the parent-child relationship of the categories. The category relations table includes a column for the parent category or component and a column for the child element, if any. In this aspect, each categorization scheme has one "top-level" category, which typically signifies a "generic" categorization. The top-level category is a parent to multiple sub-categories that typically signify broad levels of categorization, such as "mechanical", "electrical", or "document". Each sub-category is a parent in turn to further sub-categories that represent subsets of the parent category. This structure is repeated as many times as necessary to reach the desired level of detail in the categorization scheme. Typically, the deepest level of category in the tree is parent to individual elements (components) that belong to that category.

According to one aspect, a user who desires to categorize a particular known element can find the appropriate category in any scheme by starting with the top-level category. The user determines which sub-category applies most closely to the element, and then move on to the further sub-categories of that sub-category. At each level in the categorization tree, if no sub-category applies to the element, the user creates a new sub-category or assigns the element to the current category. Thus, a user need not memorize the details of any particular categorization scheme, and a non-technical person can successfully categorize a well-described element. Also, the categorization scheme can be extended as new elements are added. In some aspects, users also have the ability to edit the category descriptions, to "move" components individually or in a group to a new category, to delete categories, and to merge categories.

In another aspect of the invention a method for automatically analyzing the content of one or more Bills of Material by component type is provided. This method permits analysis using different categorization schemes and at different levels of detail within each categorization scheme. For example, a user can query the database to calculate the cost subtotals by category for all components contained in a bill of materials at any level in the categorization tree. A product manager can look at the subtotals at the top level of the tree in order to understand how the product cost was divided between electrical and mechanical components. An electrical engineer can look at the subtotals for only the electrical sub-categories to see how the product cost was divided between passive components, active components, and connectors. A salesperson can develop a completely different categorization scheme based on target markets and use it to analyze product offerings by target market. The owner of system 100 can develop a categorization scheme that is independent of any user's schemes and employ the independent scheme to guide the placement of targeted advertising.

In one embodiment, parameters and default values for each parameter are assigned to a category and, as in other class based schemes, the parameter and value is "inherited" by components belonging to that category or any level of sub-category of that category. For example, the user can assign a "package" parameter with a value of "unspecified" to the category of "Electrical Components", and a "resistance" parameter with a value of "unspecified" to the category of "0603 Surface Mount Resistors." Further, the user can specify that the value of the "package" parameter for 0603 Surface Mount Resistors was "0603". Whenever a component is added to the "0603 Surface Mount Resistors" category, "package" and "resistance" parameters are automatically assigned to the component, and the "package" parameter is automatically given the value of "0603".

Vendor Rating

Figure 16:
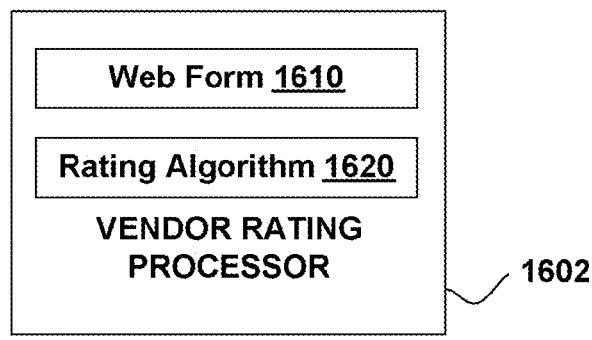
FIG. 16 is a block diagram illustrating elements included in a vendor rating processor.

One embodiment of the invention includes rating vendors. FIG. 16 is a simplified block diagram showing an embodiment of a vendor rating method 1602. The method uses a Web form 1610 and a rating algorithm 1620. Vendor rating method 1602 is for example located on system 100 and can be part of server code 200. Vendor rating method 1602 sends Web form 1610 to a user interested in inquiring on vendor ratings. Vendor rating method 1602 uses rating algorithms 1620 to calculate vendor ratings.

Vendor rating method 1602 calculates vendor ratings by comparing data between two or more of the lists in vendor transaction history 940. In one embodiment, vendor rating processor 1602 calculates vendor responsiveness to requests for quotations (timeliness) by comparing, over multiple transactions, the dates of requests for quotations and their subsequent quotations provided as detailed in request for quotation list 1010 and quotation provided list 1020. Vendor rating method 1602 also calculates the percentage of vendor quotations that result in sales by calculating how often a purchase order is issued, as shown in the purchase order issued list 1030, for each quotation provided, as shown in the quotation provided list 1020.

In one or more embodiments, vendor rating method 1602 calculates vendor responsiveness to POs (timeliness) by comparing the dates between POs issued, as recorded in the purchase order issued list 1030, and the respective POs acknowledged, as recorded in the PO Acknowledged list 1040; or between the dates of the POs issued, as recorded in purchase order issued list 1030, and the respective promises to ship, as shown in the promise to ship list 1050. Vendor rating method 1602 calculates vendor reliability by comparing, over multiple transactions, the dates between promises to ship, as recorded in promise to ship list 1050, and the respective notifications of shipment, as recorded in notification of shipment list 1060.

In one or more embodiments, vendor rating method 1602 calculates how many transactions a vendor has completed using system 100 by summing the transactions for the vendor stored in the multiple lists of vendor transaction history 940. For vendors with a sufficient volume of transactions, vendor processor 1602 illustrates vendor performance over time in an appropriate graph. For example, transaction processor 1602 displays vendor reliability over time so users could see whether a previously reliable vendor is currently extending delivery dates.

Figure 17:
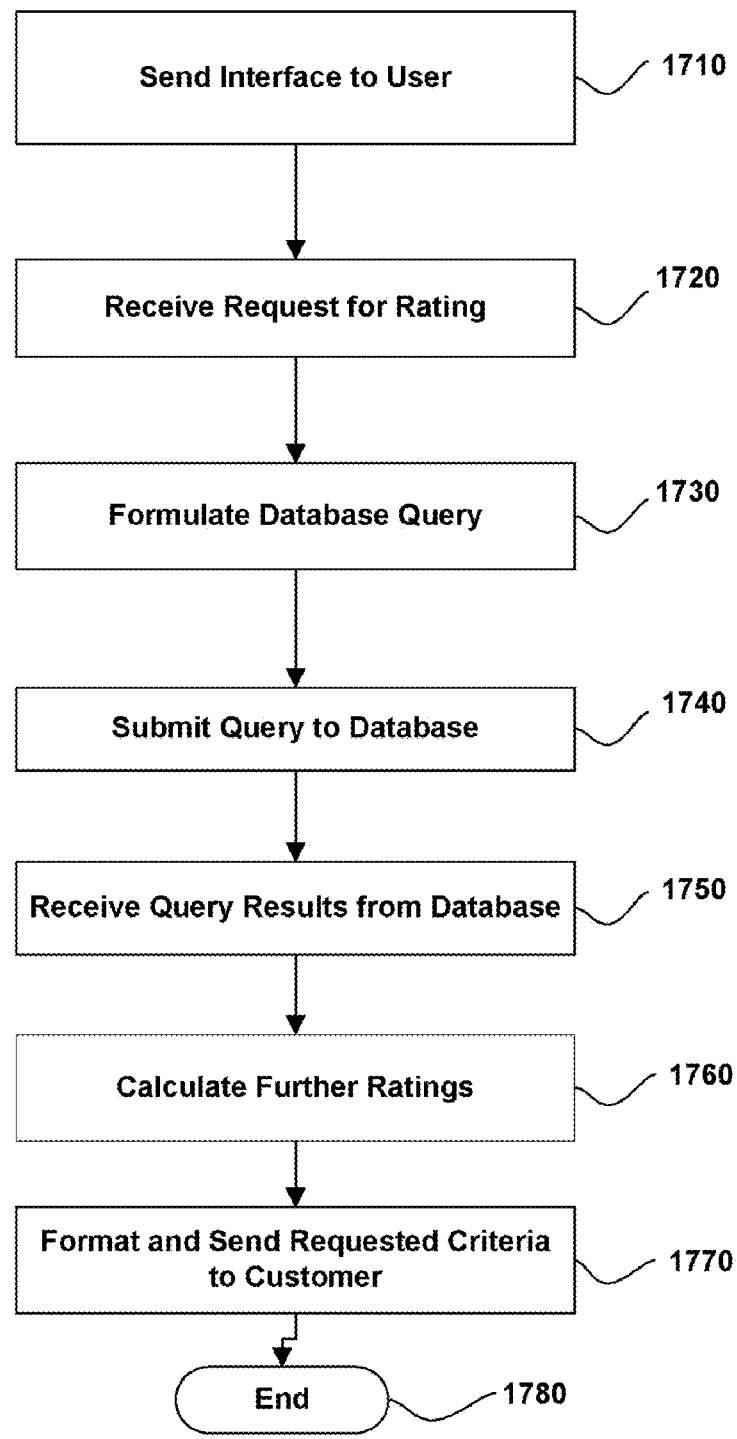
FIG. 17 is a flowchart of a method for generating a vendor rating for a vendor.

FIG. 17 is a flowchart of one embodiment of a method for generating, in real time, a vendor rating for a vendor using one or more versions of vendor rating method 1602. At a step 1710, vendor rating method 1602, via server code 200, sends an interface, such as Web form 1610, to a user. The interface allows the user to inquire regarding vendor ratings in categories such as vendor responsiveness to requests for quotations and vendor reliability. Alternatively, vendor rating method 1602 allows a user to inquire about manufacturer ratings. For example, vendor rating method 1602 calculates how often a manufacturer's element is the preferred component in a multi-source element, how many other users of system 100 specify the same element from the same manufacturer, how often a manufacturer is single-sourced on a particular element, for how many total elements a manufacturer is specified, and the like.

At a step 1720, vendor rating method 1602 receives a request for one or more vendor or manufacturer rating criteria from a user. At a step 1730, vendor rating method 1602 formulates a database query to retrieve the data from vendor transaction history 940 that is necessary for calculating the user-specified vendor rating or alternatively to retrieve pre-calculated vendor ratings 950. However, if the user requests a manufacturer rating, vendor rating method 1602 can also formulate a database query to retrieve data from element list 206.

At a step 1740, vendor rating method 1602 submits the database query to database 210, which, in turn, searches vendor transaction history 940 or pre-calculated vendor ratings (or element list 206 in the case of manufacturer ratings) for the appropriate data. At a step 1750, vendor rating method 1602 receives the results of the database query and at an optional step 1760 calculates any further performance criteria/vendor ratings (or manufacturer ratings) based on the results of the query. As discussed above in conjunction with FIG. 16, vendor rating method 1602 calculates in one or more embodiments, one or more of vendor responsiveness to requests for quotations, vendor quotation conversion, vendor responsiveness to POs, vendor reliability by comparing dates between the appropriate lists for multiple transactions as stored in vendor transaction history 940, and the like. In addition, vendor rating method 1602 provides a user with information regarding how many transactions a vendor has completed using system 100. For vendors with a sufficient volume of transactions, vendor rating method 1602 also correlates and presents vendor performance over time in an appropriate graph.

At a step 1770, vendor rating method 1602 formats and sends the requested performance criteria to the user via server code 200. The performance criteria are optionally presented graphically such as in x-y charts, pie charts, and color-coding results for a multiple-vendor query. Further, transaction processor 1602 provides multiple vendor ratings for multiple vendors in a single display for the purpose of vendor comparison. At a step 1780, the method ends.

Electronic Transaction Processing

Figure 18:
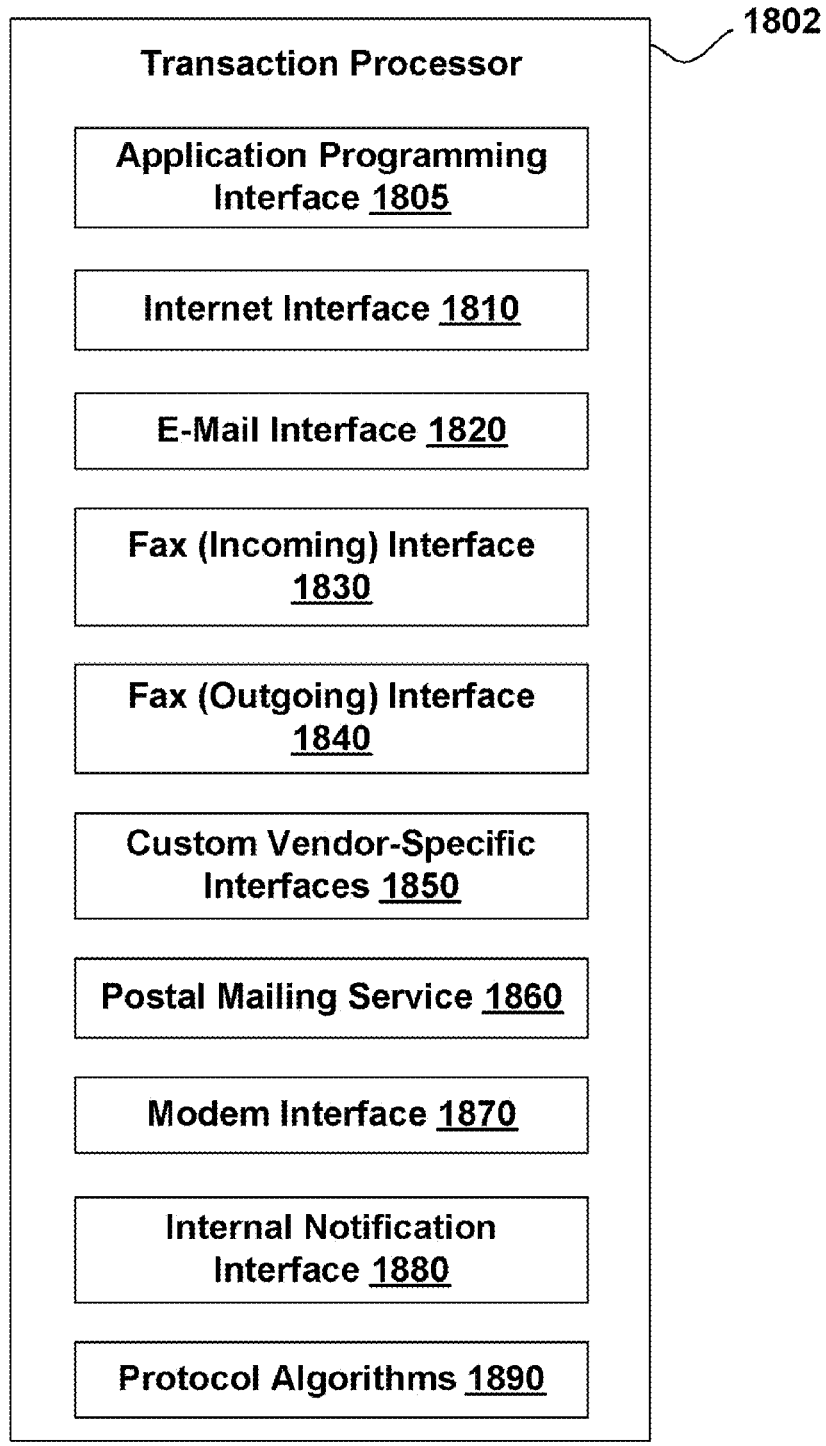
FIG. 18 is a block diagram illustrating a transaction processor.

FIG. 18 is a block diagram illustrating one embodiment of a method 1802 of processing of transactions. Transaction processing method 1802 can be included in system 100, e.g., as part of server code 200 and uses at least one of the following digital interfaces; application programming interface 1805; Internet interface 1810; e-mail interface 1820; fax (incoming) interface 1830; fax (outgoing) interface 1840; custom vendor-specific interfaces 1850; postal mailing service 1860; modem interface 1870; and internal notification interface 1880. Transaction processing method 1802 also includes protocol algorithms 1890 that employs the interfaces contained in transaction processing method 1802.

Transaction processing method 1802 sends a Web form from Internet interface 1810 to a user. The user uses the Web form to send to code in system 100 an electronic transaction request. In one embodiment, transaction processing method 1802 also sends a second Web form or the like to a vendor. The vendor uses the second Web form to initiate an electronic transaction request such as responding to a request for quotation. Alternatively, a user obtains or programs custom software to connect to code, e.g., the server code in system 100 by way of an interface such as Internet interface 1810. In this case, the user software uses the application programming interface 1805 to generate electronic transaction requests. If the user desires, such transaction requests may be initiated and executed entirely automatically, without human intervention.

The interfaces shown in FIG. 18 are all used by transaction processing method 1802 to perform electronic transactions as requested by a user. When transaction processing method 1802 is unable to complete an electronic transaction, transaction processing method 1802 sends a notification to a human operator via notification interface 1850.

Figure 19:
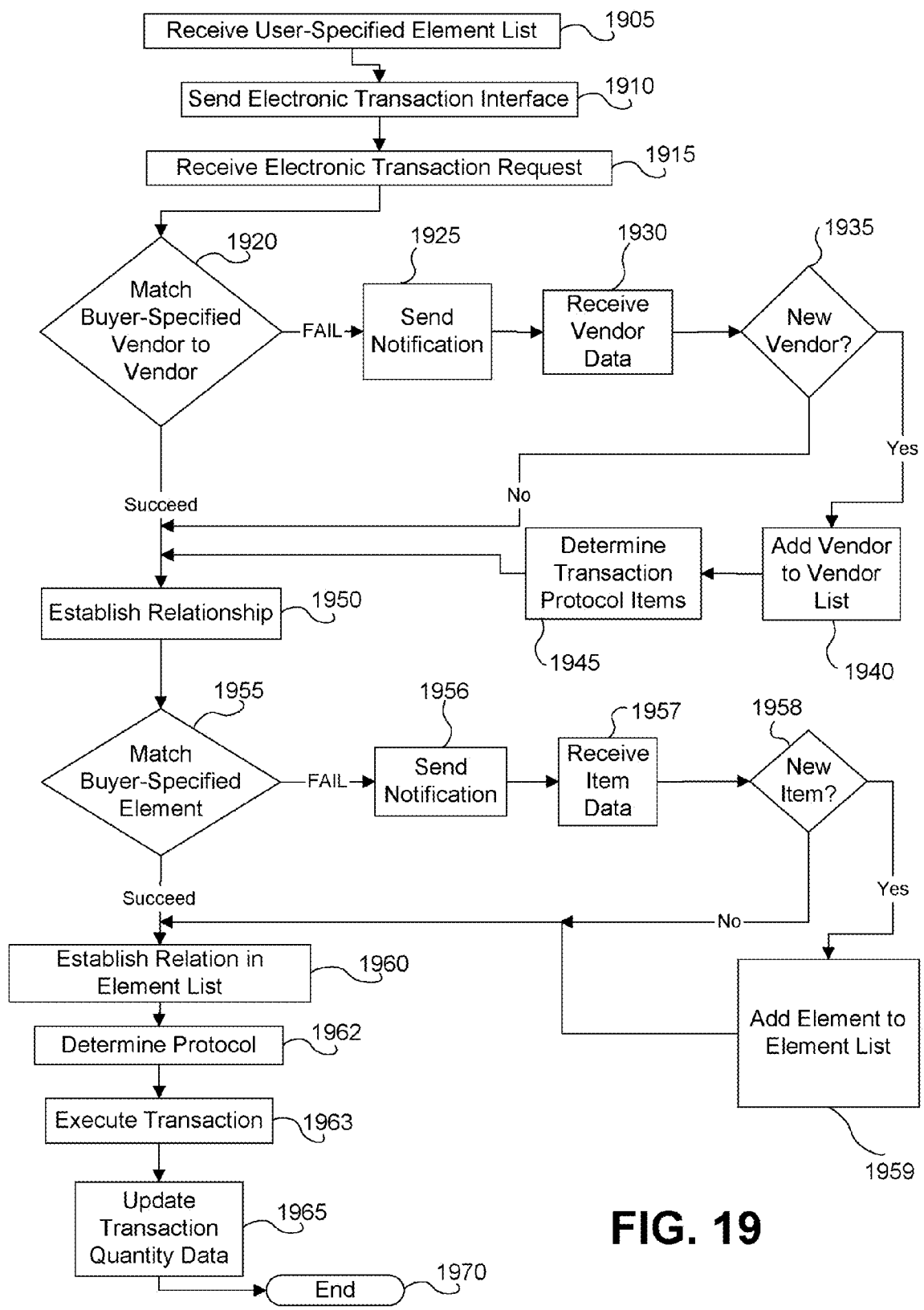
FIG. 19 is a flowchart illustrating an aspect of the invention for generating a transparent electronic transaction.

FIG. 19 is a flowchart to illustrate one or more aspects of the invention for generating electronic transactions. In a step 1905, server code 200 receives private user-specified element list 1160 as well as associated data such as private user-specified element relations 1170 and private user-specified vendor list 1180. These lists may be derived from the workspace of the user in database modules 215.

In a step 1910, transaction processor 1802, in conjunction with server code 200, sends a Web form to a user so that the user can initiate a transparent electronic transaction of a type listed in supported transaction types 1130 based on an element or elements stored in private user-specified element list 1160. A vendor can also initiate an electronic transaction, such as acknowledgement of a PO. In a step 1915, transaction processor 1802, via server code 200 receives an electronic transaction request from a user. In different embodiments, the electronic transaction request can include such information as one or more of the type of transaction to be initiated, the vendor with which to initiate the transaction, and the element to be ordered or inquired about. In addition, if the user-initiated request involves a user-designed element, the request includes design data to further define the element. Different transaction types require a variety of different information. For example, a specific "issue PO for a printed circuit board" transaction requires the user to supply the vendor with certain circuit board design data before the user can initiate the transaction. Alternatively, some transaction types do not require that a specific purchasable element be specified by the user but instead require the user to supply the vendor with descriptive parameters for a particular type of component. Then either code in system 100 or the vendor resolves the descriptive parameters into one or more particular purchasable or non-purchasable elements as part of the execution of the transaction.

Code, e.g., the server code in system 100 optionally supports a variety of protocols for vendor-initiated transactions. In one embodiment, code in system 100 enables the user to specify that he or she prefers to receive vendor-initiated transactions through transaction processor 1802. In this case, the vendor initiates a transaction through one of a variety of protocols supported by transaction processing method 1802 (as listed in supported transaction protocols 1140) and has that transaction appear to the user as an electronically generated transaction.

In a step 1920, transaction processing method 1802 attempts to match the specified vendor as indicated in the electronic request to a vendor in vendor list 920 via automated means such as matching vendor contact information. Alternatively, the electronic transaction request specifies a specific vendor from vendor list 920 and, therefore, step 1920 is skipped.

If transaction processing method 1802 cannot match the specified vendor to a vendor in vendor list 920, then transaction processing method 1802 optionally notifies a human or automated operator of system 100, via notification interface 1850, to manually determine if the specified vendor is listed in vendor list 920. In a step 1930, transaction processing method 1802 receives the results of the operator's determination. If, in a step 1935, the operator determined that the specified vendor was a known vendor, then the method continues to a step 1950, further discussed below. If the operator determines that the new vendor is a previously unknown vendor, then in a step 1940, transaction processing method 1802 adds the new vendor to vendor list 920 and initializes tracking data associated with the new vendor. In a step 1945 transaction processing method 1802 determines the appropriate transaction protocols from the list of supported transaction protocols 1140 for use in executing a transaction with the new vendor and stores the protocol data for each transaction type in vendor list 920.

In a step 1950, transaction processing method 1802 establishes a relationship between the vendor specified in step 1915 and a vendor in vendor list 920 for the purpose of processing future transactions. Even if the vendor specified in step 1915 is a new vendor, the transaction processing method 1802 can still establish the relationship between the new vendor and a vendor in vendor list 920 because the new vendor would have been added to the vendor list 920 in step 1940.

One embodiment includes a step 1955 in which the method attempts to establish a relationship (if any) between the element or elements specified in step 1915, with elements in element list 206 for future processing of electronic transactions. If transaction processing method 1802 matches the buyer-specified element to an element in the element list 206, then transaction processing method 1802 continues to a step 1960 discussed below. If transaction processing method 1802 is unable to establish a match, the buyer-specified element to an element in element list 206, then, in a step 1956, transaction processing method 1802 notifies a human operator of system 100 via internal notification interface 1880.

In a step 1956, transaction processing method 1802 receives the results from the operator's inquiry regarding matching the element. If the operator was able to match the buyer-specified element to an element in element list 206, then transaction processing method 1802 proceeds to a step 1960. If the element is new (the human operator was unable to match the buyer-specified element to an item in element list 206), then in a step 1959, transaction processing method 1802 adds the new item to element list 206.

In step 1960, transaction processing method 1802 determines the relationship between the buyer-specified element and an item in element list 206 for the purpose of processing future transactions. In a step 1962, transaction processing method 1802 determines which protocol to use for this transaction by cross-referencing the vendor and transaction type in vendor and transaction type/protocol relations 1150.

In a step 1963, transaction processing method 1802 executes the transaction using the protocol selected in step 1962.

After the transaction is completed, in one embodiment transaction processing method 1802 updates transaction quantity data item in vendor list 920 for the transaction type performed. In a step 1970 the method ends.

Targeted Advertising

Categorization of elements within a user's BOM and selection of third-party part numbers by a user provides the manager of the server system 200 and the database management system 210 that includes system 100 with information about the interests and activities of the owners and users. This information allows the manager to display targeted advertising to users. One embodiment provides for the manager of the system to offer advertising to users' element categorizations and, for example how users give item numbers or names. An individual owner's item numbering if used, item naming if used, and categorization if used, may be included in user's private user-specified element list 1160. For example, if a user has elements within their private user-specified element list 1160 categorized as "electronic power supply-switch mode," in one embodiment the server code provides any available advertisements related to alternative power supplies or DC-DC converters to that user. In another example, suppose a user has specified a part number 00-1234 from manufacturer A. Manufacturer B pays for advertisements to be shown to all users that specify part 00-1234 offering an alternative part. This permits vendors to deliver advertising to potential users that are known to be specifying a competitive compatible part and to users that are known to be interested in specific types of components. Vendors are also able to cross-sell to users who have already specified their parts. The targeted delivery of information need not be limited to advertising. For example, product updates, recall notices, and application notes can be delivered to users of specific products.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

The embodiments described above may be modified. For example, the lists in database 210 have been described as implemented as tables of a relational database. Other database types may be used in alternate embodiments. Furthermore, an element relations table was described that provides all the parent child relationships of the elements used in a plurality of BOMs. In another embodiment, a separate data structure within database 210 is used to describe each individual BOM. Such a data structure may be a table, or may be another data structure suitable for describing a tree structure. Many data structures for describing a tree are known, and new ones may be developed, and it would be clear to one in the art how to modify the description above to accommodate such a data structure.

Thus, the embodiments described above are for illustration only and are not meant to be limiting. Such embodiments may be modified in many ways without departing from the spirit and scope of the invention, limited only by the claims and their legal equivalents.

What is claimed is:

1. A method of operating a processing system for managing a plurality of bills of material (BOMs) comprising:
    storing the plurality of BOMs in the processing system, each BOM including information describable as a tree with each node an element, each element in each BOM associated with an owner of a set of owners, each BOM associated with an owner of the set of owners;
    providing access to at least some of the information of one or more of the plurality of BOMs, the providing access to information in a particular BOM controlled by at least one of: the owner of the BOM, and any entity or user designated by the owner of the BOM,
such that BOMS associated with at least two different owners are stored in the same processing system, wherein the at least two different owners need not be related except that the different owners each have information stored in the same processing system.

2. A method as recited in claim 1, wherein at least one of the BOMs includes confidential information of the owner of the BOM such that that unrestricted access to the confidential information is limited to at least one of: the owner, and any entity or user designated by the owner of the BOM.

3. A method as recited in claim 1, wherein the BOMs are stored remotely, and wherein access to the BOMs is provided remotely.

4. A method as recited in claim 1, wherein the BOMs are stored remotely, and wherein access to the BOMs is provided remotely via the Internet.

5. A method as recited in claim 1, wherein the processing system is a distributed system.

6. A method as recited in claim 1, wherein the storing of the BOMs includes:
    storing one or more data structures in the processing system to store the plurality of BOMs,
the method further comprising:
    storing a list of elements in the processing system, each element in the list of elements having a unique element identifier, each element in each BOM being one of the elements in the list of elements,
such that the list of elements and the one or more data structures are part of a database stored in the same processing system.

7. A method as recited in claim 6, wherein one or more elements in the element list are associated with a respective owner of a set of owners, and wherein the list of elements includes an indication of ownership for each element associated with one of the owners, the method further comprising:
    restricting access to information about a particular element in the element list that is associated with a particular owner to at least one of: the particular owner, and any entity or user designated by the particular owner.

8. A method as recited in claim 6, wherein a first BOM of a first owner may share one or more elements of the list of elements with a second BOM of a second owner.

9. A method as recited in claim 6,
    wherein one or more elements in the element list is associated with a respective owner of the set of owners,
    wherein the list of elements includes an indication of ownership for each element associated with one of the owners; and
    wherein the confidential information of an owner that owns an element in the list of elements includes confidential information in the list of elements,
    such that unrestricted access to confidential information about a particular element in the element list that is associated with a particular owner is limited at least one of: to the particular owner, and any entity or user designated by the particular owner.

10. A method as recited in claim 6,
    wherein an element in the element list is one of the set consisting of a physical element and a process,
    wherein the physical element may itself be a BOM, and
    wherein the process may reference a set of steps or operations.

11. A method as recited in claim 6, wherein each BOM data structure is for storing the parent-child relationships for at least one BOM of the plurality of BOMs, and wherein a BOM data structure includes, for a particular BOM, an entry for each element in the particular BOM, said element entry including a reference to the element's entry in the list of elements, an entry indicating the owner, and an entry indicating any child of the element in the case the element has a child in the tree representing the particular BOM.

12. A method as recited in claim 11, wherein the parent child relationships for all the BOMS are stored in a single BOM data structure.

13. A method as recited in claim 11, wherein the database is a relational database, and wherein the list of elements and the BOM data structure are each a table in the relational database, and wherein the element identifier is a single field in the table of the list of elements forming a primary key for the table of the list of elements.

14. A computer-readable storage medium configured with instructions that, when executed by one or more processors of a processing system, cause carrying out a method for managing a plurality of bills of material (BOMs), the method comprising:
    storing the plurality of BOMs in the processing system, each BOM including information describable as a tree with each node an element, each element in each BOM associated with an owner of a set of owners, each BOM associated with an owner of the set of owners;
    providing access to at least some of the information of one or more of the plurality of BOMs, the providing access to information in a particular BOM controlled by one or more of: the owner of the BOM, and any entity or user designated by the owner of the BOM,
such that BOMS associated with at least two different owners are stored in the same processing system, wherein the at least two different owners need not be related except that the different owners each have information stored in the same processing system.

15. A computer-readable storage medium as recited in claim 14, wherein at least one of the BOMs includes confidential information of the owner of the BOM such that that unrestricted access to the confidential information is limited to one or more of: the owner, and any entity or user designated by the owner of the BOM.

16. A computer-readable storage medium as recited in claim 14, wherein the BOMs are stored remotely, and wherein access to the BOMs is provided remotely via a network.

17. A computer-readable storage medium as recited in claim 14, wherein the storing of the BOMs includes:
    storing one or more data structures in the processing system to store the plurality of BOMs,
the method further comprising:
    storing a list of elements in the processing system, each element in the list of elements having a unique element identifier, each element in each BOM being one of the elements in the list of elements,
such that the list of elements and the one or more data structures are part of a database stored in the same processing system.

18. A computer-readable storage medium as recited in claim 17, wherein one or more elements in the element list are associated with a respective owner of a set of owners, and wherein the list of elements includes an indication of ownership for each element associated with one of the owners, the method further comprising:
    restricting access to information about a particular element in the element list that is associated with a particular owner to at least one of: the particular owner, and any entity or user designated by the particular owner.

19. A computer-readable storage medium as recited in claim 17, wherein a first BOM of a first owner may share one or more elements of the list of elements with a second BOM of a second owner.

20. A computer-readable storage medium as recited in claim 17,
    wherein one or more elements in the element list is associated with a respective owner of the set of owners,
    wherein the list of elements includes an indication of ownership for each element associated with one of the owners; and
    wherein the confidential information of an owner that owns an element in the list of elements includes confidential information in the list of elements,
    such that unrestricted access to confidential information about a particular element in the element list that is associated with a particular owner is limited to at least one of: the particular owner, and any entity or user designated by the particular owner.

21. A computer-readable storage medium as recited in claim 17, wherein each BOM data structure is for storing the parent-child relationships for at least one BOM of the plurality of BOMs, and wherein a BOM data structure includes, for a particular BOM, an entry for each element in the particular BOM, said element entry including a reference to the element's entry in the list of elements, an entry indicating the owner, and an entry indicating any child of the element in the case the element has a child in the tree representing the particular BOM.

22. A computer-readable storage medium as recited in claim 21, wherein the database is a relational database, and wherein the list of elements and the BOM data structure are each a table in the relational database, and wherein the element identifier is a single field in the table of the list of elements forming a primary key for the table of the list of elements.

23. A processing system for managing a plurality of bills of material (BOMs), the processing system comprising:
    one or more processors;
    a storage subsystem including one or more memory elements;
    wherein the storage subsystem is configured with instructions that when executed by at least one or more processors cause:
        storing the plurality of BOMs in the processing system, each BOM including information describable as a tree with each node an element, each element in each BOM associated with an owner of a set of owners, each BOM associated with an owner of the set of owners; and
        providing access to at least some of the information of one or more of the plurality of BOMs, the providing access to information in a particular BOM controlled by at least one of: the owner of the BOM, and any entity or user designated by the owner of the BOM,
such that BOMS associated with at least two different owners are stored in the same processing system, wherein the at least two different owners need not be related except that the different owners each have information stored in the same processing system.

24. A processing system as recited in claim 23, wherein at least one of the BOMs includes confidential information of the owner of the BOM such that that unrestricted access to the confidential information is limited to at least one of: the owner, and any entity or user designated by the owner of the BOM.

25. A processing system as recited in claim 23, wherein the BOMs are stored remotely, and wherein access to the BOMs is provided remotely via a network.

26. A processing system as recited in claim 23, wherein the storing of the BOMs includes:
    storing one or more data structures in the processing system to store the plurality of BOMs, and wherein the instructions when executed further cause:
  storing a list of elements in the processing system, each element in the list of elements having a unique element identifier, each element in each BOM being one of the elements in the list of elements,
such that the list of elements and the one or more data structures are part of a database stored in the same processing system.

27. A processing system as recited in claim 26,
wherein one or more elements in the element list are associated with a respective owner of a set of owners, and wherein the list of elements includes an indication of ownership for each element associated with one of the owners, and
wherein the instructions when executed further cause:
  restricting access to information about a particular element in the element list that is associated with a particular owner to at least one of the particular owner, and any entity or user designated by the particular owner.

28. A processing system as recited in claim 26, wherein a first BOM of a first owner may share one or more elements of the list of elements with a second BOM of a second owner.

29. A processing system as recited in claim 26,
wherein one or more elements in the element list is associated with a respective owner of the set of owners,
wherein the list of elements includes an indication of ownership for each element associated with one of the owners, and
wherein the confidential information of an owner that owns an element in the list of elements includes confidential information in the list of elements,
such that unrestricted access to confidential information about a particular element in the element list that is associated with a particular owner is limited to at least one of: the particular owner, and any entity or user designated by the particular owner.

30. A processing system as recited in claim 26, wherein each BOM data structure is for storing the parent-child relationships for at least one BOM of the plurality of BOMs, and wherein a BOM data structure includes, for a particular BOM, an entry for each element in the particular BOM, said element entry including a reference to the element's entry in the list of elements, an entry indicating the owner, and an entry indicating any child of the element in the case the element has a child in the tree representing the particular BOM.

31. A processing system as recited in claim 30, wherein the parent child relationships for all the BOMS are stored in a single BOM data structure.

32. A processing system as recited in claim 30, wherein the database is a relational database, and wherein the list of elements and the BOM data structure are each a table in the relational database, and wherein the element identifier is a single field in the table of the list of elements forming a primary key for the table of the list of elements.

33. A system for managing a plurality of bills of material (BOMs) comprising:
  a client terminal accepting information for a particular BOM, the particular BOM being one of a plurality of BOMS, each BOM including information describable as a tree with each node an element, each element in each BOM associated with an owner of a set of owners, each BOM associated with an owner of the set of owners, the particular BOM having a particular owner, the client terminal coupled to a network;
  a server processing system configured to store the plurality of BOMs, the server processing system coupled to the network such that the client terminal is coupled to the server system via the network; and
  wherein the system is configured to provide access to at least some of the information of one or more of the plurality of BOMs to one or more users, the providing access to information in a particular BOM controlled by at least one of: the owner of the BOM, and any entity or user designated by the owner of the BOM,
such that BOMS associated with at least two different owners are stored in the same processing system, wherein the at least two different owners need not be related except that the different owners each have information stored in the same server processing system.

34. A system as recited in claim 33, wherein at least one of the BOMs includes confidential information of the owner of the BOM such that that unrestricted access to the confidential information is limited to at least one of: the owner, and any entity or user designated by the owner of the BOM.

35. A system as recited in claim 33, wherein the plurality of BOMS is stored in the server processing system as one or more BOM data structures in a database, and wherein the database further includes a list of elements, one or more of the elements being for inclusion in one or more of the plurality of BOMs.

36. A system as recited in claim 35, wherein each of one or more elements in the element list is associated with a respective owner of the set of owners, wherein the list of elements includes an indication of ownership for each element associated with one of the owners, and wherein the system is further configured to restrict access to information about a particular element in the element list that is associated with a particular owner to at least one of: the particular owner, and to one or more designates of the particular owner.

37. A system as recited in claim 36,
wherein each element has a unique identifier,
wherein the database further includes a list of owners in the set of owners, each owner having an entry including a unique owner identifier in the list of owners, and
wherein the providing access to one or more users includes providing access to one or more elements of information in the database, the access being remote from the server processing system, the remote access provided according to the control information.

38. A system as recited in claim 36, wherein the database is arranged such that a first BOM of a first owner may share one or more elements of the list of elements with a second BOM of a second owner.

39. A system as recited in claim 36, wherein an element in the element list is one of the set consisting of a physical element and a process,
wherein the physical element may itself be represented by a BOM, and
wherein the process may reference a set of steps or operations.

40. A system as recited in claim 36, wherein each BOM data structure is for storing the parent-child relationships for at least one BOM of the plurality of BOMs, and wherein a BOM data structure includes, for a particular BOM, an entry for each element in the particular BOM, said element entry including a reference to the element's entry in the list of elements, an entry indicating the owner, and an entry indicating any child of the element in the case the element has a child in the tree representing the particular BOM.

41. A system as recited in claim 40, wherein the parent child relationships for all the BOMS are stored in a single BOM data structure.

42. A system as recited in claim 36, wherein the database further includes a list of users, each user having an entry in the list of users that includes a unique user identifier in the list of users, each user possibly being associated with one or more of the owners, and wherein the particular owner or one or more designates of the particular owner may set different levels of access to information in the database associated with the particular owner to each user.

43. A system as recited in claim 42, wherein each entry for a user further includes a function of a user password, and wherein the remote terminal is configured to
- accept a user password or other credentials, or both a password and other credentials provided by a user, and the system is configured to:
- identify the user using said password or other credentials, or both a password and other credentials; and
- provide access according to successfully identifying the user as one in the list of users and providing access according to the identity of one or more of the owners associated with the identified user in the case that the identified user is associated with at least one owner.

44. A system as recited in claim 36, wherein the database includes a list of vendors to provide data related to vendors for one or more elements of the element list.

45. A system as recited in claim 44, wherein the database includes a vendor element relations list that includes data relating one or more elements of the element list to one or more corresponding vendors of the vendor list such that the vendor element relations list provides the sourcing relationship between an element in the element list and a vendor in the vendor list.

46. A system as recited in claim 45, wherein one or more users may be associated with a vendor in the vendor list, and wherein the system is further configured to a particular user associated with a particular vendor access to information about an element in the element list that is sourced by the particular vendor.

47. A system as recited in claim 45, wherein a level of access is provided to the particular user associated with the particular vendor and is set by at least one of: the owner associated with the particular element, and one or more designates of the owner.

48. A computer implemented method for managing a plurality of bills of material (BOMs) comprising:
- accepting in a computer system information for a particular BOM, the particular BOM being one of a plurality of BOMS, each BOM including information describable as a tree with each node an element, each element in each BOM associated with an owner of a set of owners, each BOM associated with an owner of the set of owners, the particular BOM having a particular owner, the computer system being coupled to a network;
- sending by the computer system of the information over the network to a server processing system also coupled to the network, the server processing system having stored therein the plurality of BOMs, including the particular BOM, the server processing configured to provide access to at least some of the information of one or more of the plurality of BOMs to one or more users, the providing access to information in a particular BOM controlled by at least one of: the owner of the BOM, and any entity or user designated by the owner of the BOM, such that BOMs associated with different owners are stored in the same processing system, such that BOMS associated with at least two different owners are stored in the same processing system, wherein the at least two different owners need not be related except that the different owners each have information stored in the same server processing system.

49. A computer implemented method as recited in claim 48, wherein the public network is the Internet.

50. A computer implemented method as recited in claim 48, wherein at least one of the BOMs includes confidential information of the owner of the BOM such that that unrestricted access to the confidential information is limited to at least one of: the owner, and any entity or user designated by the owner of the BOM.

51. A computer implemented method as recited in claim 48, wherein the plurality of BOMS is stored in the server processing system as one or more BOM data structures in a database, and wherein the database further includes a list of elements, one or more of the elements being for inclusion in one or more of the plurality of BOMs.

52. A computer implemented method as recited in claim 51, wherein each of one or more elements in the element list is associated with a respective owner of the set of owners, wherein the list of elements includes an indication of ownership for each element associated with one of the owners, and wherein the system is further configured to restrict access to information about a particular element in the element list that is associated with a particular owner to at least one of: the particular owner, and to one or more designates of the particular owner.

53. A computer implemented method as recited in claim 52,
- wherein each element has a unique identifier,
- wherein the database further includes a list of owners in the set of owners, each owner having an entry including a unique owner identifier in the list of owners, and
- wherein the providing access to one or more users includes providing access to one or more elements of information in the database, the access being remote from the server processing system, the remote access provided according to the control information.

54. A computer implemented method as recited in claim 52, wherein the database is arranged such that a first BOM of a first owner may share one or more elements of the list of elements with a second BOM of a second owner.

55. A computer implemented method as recited in claim 52, wherein an element in the element list is one of the set consisting of a physical element and a process,
- wherein the physical element may itself be represented by a BOM, and
- wherein the process may reference a set of steps or operations.

56. A computer implemented method as recited in claim 52, wherein each BOM data structure is for storing the parent-child relationships for at least one BOM of the plurality of BOMs, and wherein a BOM data structure includes, for a particular BOM, an entry for each element in the particular BOM, said element entry including a reference to the element's entry in the list of elements, an entry indicating the owner, and an entry indicating any child of the element in the case the element has a child in the tree representing the particular BOM.

57. A computer implemented method as recited in claim 52, wherein the parent child relationships for all the BOMs are stored in a single BOM data structure.

58. A computer implemented method as recited in claim 52, wherein the database further includes a list of users, each user having an entry in the list of users that includes a unique user identifier in the list of users, each user possibly being associated with one or more of the owners, and wherein the particular owner or one or more designates of the particular owner may set different levels of access to information in the database associated with the particular owner to each user.

59. A computer implemented method as recited in claim 52, wherein the database further includes a list of users, each user having an entry in the list of users that includes a unique user identifier in the list of users, each user possibly being associated with one or more of the owners, and wherein each entry for a user further includes a function of a user password, and wherein the remote terminal is configured to accept a user password or other credentials, or both a password and other credentials provided by a user, and the system is configured to:
- identify the user using said password or other credentials, or both a password and other credentials; and
- provide access according to successfully identifying the user as one in the list of users and providing access according to the identity of one or more of the owners associated with the identified user in the case that the identified user is associated with at least one owner.

60. A computer implemented method as recited in claim 52, wherein the database includes a list of vendors to provide data related to vendors for one or more elements of the element list.

61. A computer implemented method as recited in claim 60, wherein the database further includes a list of users, each user having an entry in the list of users that includes a unique user identifier in the list of users, each user possibly being associated with one or more of the owners, and wherein the database includes a vendor element relations list that includes data relating one or more elements of the element list to one or more corresponding vendors of the vendor list such that the vendor element relations list provides the sourcing relationship between an element in the element list and a vendor in the vendor list.

62. A computer implemented method as recited in claim 61, wherein one or more users may be associated with a vendor in the vendor list, and wherein the system is further configured to a particular user associated with a particular vendor access to information about an element in the element list that is sourced by the particular vendor.

63. A computer implemented method as recited in claim 61, wherein a level of access is provided to the particular user associated with the particular vendor and is set by at least one of: the owner associated with the particular element, and one or more designates of the owner.

* * * * *